United States Patent
Hopkins et al.

(10) Patent No.: US 11,874,251 B2
(45) Date of Patent: Jan. 16, 2024

(54) ION MOBILITY SPECTROMETER AND METHOD OF ANALYZING IONS

(71) Applicant: JP SCIENTIFIC LIMITED, Waterloo (CA)

(72) Inventors: Scott Hopkins, Waterloo (CA); Janusz B. Pawliszyn, Waterloo (CA)

(73) Assignee: JP SCIENTIFIC LIMITED, Waterloo (CA)

( * ) Notice: Subject to any disclaimer, the term of this patent is extended or adjusted under 35 U.S.C. 154(b) by 0 days.

(21) Appl. No.: 17/940,097

(22) Filed: Sep. 8, 2022

(65) Prior Publication Data

US 2023/0003686 A1 Jan. 5, 2023

Related U.S. Application Data

(63) Continuation-in-part of application No. 17/667,165, filed on Feb. 8, 2022, now Pat. No. 11,598,748, which
(Continued)

(51) Int. Cl.
*H01J 49/00* (2006.01)
*G01N 27/622* (2021.01)

(52) U.S. Cl.
CPC ................... *G01N 27/622* (2013.01)

(58) Field of Classification Search
CPC ........ G01N 27/622; H01J 49/00; H01J 49/02; H01J 49/06; H01J 49/062; H01J 49/066
(Continued)

(56) References Cited

U.S. PATENT DOCUMENTS 4,390,784 A * 6/1983 Browning ............ G01N 27/622
250/286
5,759,370 A 6/1998 Pawliszyn
(Continued)

FOREIGN PATENT DOCUMENTS

CA 2829828 A1 9/2012
EP 1963835 A1 9/2008
(Continued)

OTHER PUBLICATIONS

Buryakov et al., "A New Method of Separation of Multi-Atomic Ions by Mobility at Atmospheric Pressure Using a High-frequency Amplitude-Asymmetric Strong Electric Field," International Journal of Mass Spectrometry and Ion Processes, 1993, vol. 128, pp. 143-148.
(Continued)

*Primary Examiner* — Jason L McCormack
(74) *Attorney, Agent, or Firm* — Borden Ladner Gervais LLP; David A. Nauman

(57) ABSTRACT

An ion mass spectrometer that has an ion channel shaped to modify the speed of a carrier gas as the carrier gas traverses the ion channel. In one case, the ion channel has a tapered shape, which continuously varies the gas flow rate. This arrangement is made using conductors located in the drift tube. This controlled variation in speed together with the control of the axial electric field in the ion channel, provide greater control on the separation of ions in the ion channel. A method of analyzing ions based on a variation of at least one of axial electric field and of the speed of the flowing gas in the ion channel is also disclosed.

17 Claims, 19 Drawing Sheets

Related U.S. Application Data is a continuation of application No. 16/969,358, filed as application No. PCT/CA2019/050180 on Feb. 13, 2019, now Pat. No. 11,275,054.

(60) Provisional application No. 63/286,234, filed on Dec. 6, 2021, provisional application No. 62/629,763, filed on Feb. 13, 2018.

(58) Field of Classification Search
USPC .................. 250/281, 282, 286, 290, 293
See application file for complete search history.

(56) References Cited

U.S. PATENT DOCUMENTS

| | | | |
|---|---|---|---|
| 5,847,386 A | 12/1998 | Thomson et al. | |
| 6,107,628 A * | 8/2000 | Smith | H01J 49/066 250/292 |
| 6,111,250 A * | 8/2000 | Thomson | H01J 49/005 250/281 |
| 6,630,662 B1 | 10/2003 | Loboda | |
| 7,081,618 B2 | 7/2006 | Laprade | |
| 7,714,278 B2 | 5/2010 | Boyle et al. | |
| 7,838,826 B1 * | 11/2010 | Park | G01N 27/623 250/281 |
| 8,410,432 B2 | 4/2013 | Miller et al. | |
| 10,989,960 B2 | 4/2021 | Yu et al. | |
| 2003/0213903 A1 | 11/2003 | Ichimura et al. | |
| 2006/0219889 A1 * | 10/2006 | Shvartsburg | H01J 49/40 250/282 |
| 2009/0294641 A1 * | 12/2009 | Konicek | H01J 49/4225 250/281 |
| 2010/0301210 A1 * | 12/2010 | Bertsch | G21K 1/093 250/290 |
| 2011/0121170 A1 | 5/2011 | Park | |
| 2011/0183431 A1 * | 7/2011 | Covey | G01N 27/624 250/282 |
| 2012/0261570 A1 | 10/2012 | Shvartsburg et al. | |
| 2012/0273674 A1 | 11/2012 | Park et al. | |
| 2013/0206973 A1 * | 8/2013 | Kovtoun | H01J 49/063 250/288 |
| 2014/0353493 A1 * | 12/2014 | Mordehai | H01J 49/062 250/281 |
| 2015/0102215 A1 * | 4/2015 | Jung | H01J 49/4215 250/282 |
| 2016/0126083 A1 | 5/2016 | Hoyes | |
| 2016/0181080 A1 * | 6/2016 | Williams | H01J 49/065 250/292 |
| 2018/0151339 A1 * | 5/2018 | Wildgoose | G01N 27/62 |

FOREIGN PATENT DOCUMENTS

| | | |
|---|---|---|
| EP | 3252460 A1 | 12/2017 |
| WO | 0122049 A2 | 3/2001 |
| WO | 2007056488 A1 | 5/2007 |

OTHER PUBLICATIONS

Coughlan et al., "Photo and Collision Induced Isomerization of a Cyclic Retinal Derivative: An Ion Mobility Study," Journal of the American Society for Mass Spectrometry, Sep. 2016, vol. 27 (9), pp. 1483-1490.
Drees et al., "3d-printing of a Complete Modular Ion Mobility Spectrometer," Materials Today, Apr. 2021, vol. 44, pp. 58-68.
European Patent Application No. 19754561.9, Extended European Search Report dated Oct. 25, 2021.
Fang et al., "A Model of Thermally Generated Ph Gradients in Tapered Capillaries," Analyst, 1999, vol. 124, pp. 335-341.
Fernandez-Lima et al., "Gas-Phase Separation Using a Trapped Ion Mobility Spectrometer," International Journal for Ion Mobility Spectrometry, Sep. 2011, vol. 14(2-3), 10 pages.
Gunther et al., "Berlintrap: a New Cryogenic 22-pole Ion Trap Spectrometer," Journal of Molecular Spectroscopy, 2017, vol. 332, pp. 8-15.
International Patent Application No. PCT/CA2019/050180, International Preliminary Report on Patentability and Written Opinion dated Aug. 18, 2020.
International Patent Application No. PCT/CA2019/050180, International Search Report and Written Opinion dated Apr. 10, 2019.
Kamrath et al., "Combining Ion Mobility and Cryogenic Spectroscopy for Structural and Analytical Studies of Biomolecular Ions," Accounts of Chemical Research, Jun. 2018, vol. 51 (6), pp. 1487-1495.
Kaplan et al., "Resistive Glass IM-TOFMS," Analytical Chemistry, Nov. 2010, vol. 82 (22), pp. 9336-9343.
Kaplan et al., "Supporting Information: A Resistive Glass Ion Mobility-Time-of-Flight Mass Spectrometer (IMtofMS),".
Kwasnik et al., "Performance, Resolving Power, and Radial Ion Distributions of a Prototype Nanoelectrospray Ionization Resistive Glass Atmospheric Pressure Ion Mobility Spectrometer," Analytical chemistry, Oct. 2007, vol. 79 (20), pp. 7782-7791.
Page et al., "Variable Low-mass Filtering Using an Electrodynamic Ion Funnel," Journal of Mass Spectrometry, 2005, vol. 40, pp. 1215-1222.
Pawliszyn and Wu., "Ampholyte-Free Isoelectric Focusing of Proteins in Cone Shaped Capillaries," Journal of Microcolumn Separations, 1993, vol. 5(5), pp. 397-401.
Pawliszyn et al., "Properties and Applications of the Concentration Gradient Sensor to Detection of Flowing Samples," Analytical chemistry, 1986, vol. 58, pp. 3207-3215.
Ridgeway et al., "Trends in Trapped Ion Mobility E Mass Spectrometry Instrumentation," Trends in Analytical Chemistry, 2019, vol. 116, pp. 324-331.
Shvartsburg and Smith., "Fundamentals of Traveling Wave Ion Mobility Spectrometry," Analytical Chemistry, 2008, vol. 80, pp. 9699-9699.
U.S. Appl. No. 16/969,358, Requirement for Restriction Office action dated May 28, 2021.
U.S. Appl. No. 17/667,165, Notice of Allowance dated Jun. 13, 2022.
U.S. Appl. No. 16/969,358, Final Office Action dated Oct. 4, 2021.
U.S. Appl. No. 16/969,358 Notice of Allowance dated Dec. 22, 2021.
U.S. Appl. No. 16/969,358 Notice of Allowance dated Nov. 22, 2021.
U.S. Appl. No. 17/667,165 Notice of Allowance dated Apr. 22, 2022.
U.S. Appl. No. 16/969,358, Non-Final Office Action dated Jul. 27, 2021.
Wester., "Radiofrequency Multipole Traps: Tools for Spectroscopy and Dynamics of Cold Molecular Ions," Journal of Physics B: Atomic, Molecular and Optical Physics, 2009, vol. 42: 154001, 13 pages.
Wyttenbach et al., "A New Instrument With High Mass and High Ion Mobility Resolution," International Journal of Mass Spectrometry, 2018, vol. 434, pp. 108-115.
Zeleny., "VI. On the Ratio of the Velocities of the Two Ions Produced in Gases by Röntgen Radiation; and on Some Related Phenomena," The London, Edinburgh, and Dublin Philosophical Magazine and Journal of Science, 1898, vol. 46(278), pp. 120-154.
European Patent Application No. 19754561.9, European Office Action dated Aug. 16, 2023.

* cited by examiner

ION MOBILITY SPECTROMETER AND METHOD OF ANALYZING IONS

CROSS REFERENCE TO RELATED APPLICATIONS

This application is a Continuation-in-Part of U.S. application Ser. No. 17/667,165, filed on Feb. 8, 2022, which is a Continuation of U.S. application Ser. No. 16/969,358, filed Aug. 12, 2018, which is 371 application of PCT/CA2019/050180, filed Feb. 13, 2019, which claims the benefit of priority of U.S. Provisional Patent Application No. 62/629,763, filed Feb. 13, 2018. In addition, this application claims the benefit of priority of U.S. Provisional Patent Application No. 63/286,234, filed Dec. 6, 2021. U.S. application Ser. Nos. 17/667,165 and 16/969,358, PCT/CA2019/050180, and U.S. Provisional Patent Applications Nos. 62/629,763 and 63/286,234 are incorporated herein by reference.

FIELD

The present disclosure relates to ion mobility spectrometry in general and to trapped ion mobility spectrometry in particular. More particularly, the present disclosure relates to an ion mobility spectrometer and to a method of analyzing ions.

BACKGROUND

Ion mobility spectrometry is a technique used to separate and identify ionized molecules in the gas phase based on their mobility in a flowing carrier gas. There exist a number of variants to this method including, trapped ion mobility spectrometry in which a radio frequency (RF) electric field radially confines (traps) ions in an ion channel while a flowing carrier gas forces (drags) ions along the ion channel while simultaneously, an electric field exerts an electric force on the ions, in a direction opposite the direction followed by the flowing carrier gas. The competing drag and electric forces act to separate the ions as a function of their mass to charge ratio and as a function of their collisional cross-section.

Trapped ion mobility spectrometry remains limited with respect to controlling the linear velocity (speed) of the carrier gas in the ion channel, the effectiveness of the RF field in radially confining the ions along the center of the ion channel, and the control of the electric field along the ion channel.

Therefore, improvements in ion mobility spectrometry are desirable.

The above information is presented as background information only to assist with an understanding of the present disclosure. No assertion or admission is made as to whether any of the above, or anything else in the present disclosure, unless explicitly stated, might be applicable as prior art with regard to the present disclosure.

BRIEF SUMMARY

According to an aspect, there is provided an ion mobility spectrometer comprising an analyzer, the analyzer having a body defining an ion channel extending therethrough, the ion channel being continuous, the ion channel having an input section at a first end of the body for receiving ions and an output section at a second end of the body for outputting ions, a resistive conductor extending along the ion channel and configured to generate an electric field along the ion channel when a DC signal is applied across the resistive conductor, wherein the resistive conductor is separate from the body.

In an embodiment, at least one of the body comprises an electrically insulating material, and an electrically insulating material is disposed between the body and the resistive conductor.

In an embodiment, the analyzer comprises a coating including a resistive material disposed at the body in the ion channel, wherein the resistive conductor comprises the coating.

In an embodiment, the analyzer comprises a plurality of elongate resistive conductor elements disposed at the body in the ion channel and extending along the ion channel, wherein the resistive conductor comprises the plurality of elongate resistive conductor elements such that the DC signal is applicable across each of the elongate resistive conductor elements to generate an electric field along the ion channel.

In an embodiment, the plurality of elongate resistive conductor elements are attached to a surface of the body defining the ion channel.

In an embodiment, the analyzer comprises a plurality of electrodes extending along the ion channel and configured to generate a confining field when a time-varying electrical signal is applied to the plurality of electrodes, the confining field for confining ions in the ion channel along a central portion of the ion channel.

In an embodiment, the time-varying electrical signal is a radio frequency (RF) electrical signal.

In an embodiment, the RF electrical signal is a multipole RF signal.

In an embodiment, the plurality of electrodes are disposed at the body in the ion channel, and wherein the plurality of electrodes are disposed radially around a longitudinal axis of the ion channel.

In an embodiment, the plurality of electrodes comprises at least four electrodes, and wherein the electrodes are disposed radially around a longitudinal axis of the ion channel in a spaced-apart arrangement.

In an embodiment, the plurality of electrodes comprises wires.

In an embodiment, the body defines the ion channel to have a diameter that varies monotonically along the ion channel.

In an embodiment, the body defines the ion channel to have a diameter that varies monotonically along the entire length ion channel.

In an embodiment, the diameter of the ion channel decreases from the input section to the output section.

In an embodiment, the diameter of the ion channel decreases substantially continuously, substantially linearly, or substantially quadratically from the input section to the output section.

In an embodiment, the body defines the ion channel to include a plurality of segments each having a respective substantially constant diameter different from the diameter of the other segments of the plurality of segments.

In an embodiment, the body defines the ion channel to have a constant diameter along the ion channel.

In an embodiment, the body defines the ion channel to have a constant diameter along the entire length of the ion channel.

In an embodiment, the resistive conductor has a gradient of resistance along the ion channel so that the resistive conductor is configured to generate an electric field gradient along the ion channel when a DC signal is applied across the resistive conductor.

In an embodiment, the ion mobility analyzer is configured to receive, at the input section, a flowing carrier gas and to provide the flowing carrier gas to the ion channel, wherein the ion mobility analyzer comprises at least one of a source of carrier gas providing the flowing carrier gas, a source of reagent carrier gas providing the flowing carrier gas, and a source of carrier gas providing the flowing carrier gas and a source of reagent compound configured to provide a reagent compound for mixing with the flowing carrier gas.

In an embodiment, the ion mobility analyzer is configured to control temperature in the drift tube to be substantially below the ambient temperature.

In another aspect, the present disclosure provides an ion mobility spectrometer that comprises an ion mobility analyzer, which has: a body defining an ion channel extending therethrough, the ion channel being continuous, the ion channel having a diameter that varies monotonically along the ion channel, the ion channel having an input section and an output section. The ion mobility analyzer further has: electrodes set in the body, along the ion channel and around the ion channel, the electrodes being arranged to receive an adjustable DC electrical signal and an adjustable time-varying electrical signal, the adjustable DC electrical signal to generate an electric field along the ion channel, the time-varying electrical signal to generate a confining field to confine ions in the ion channel along a central portion of the ion channel, the central portion extending parallel to the ion channel. Additionally, the ion mobility analyzer has: an entrance guide coupled to the input section of the ion channel, the entrance guide configured to guide ions to the ion channel. Furthermore, the ion mobility analyzer has an exit guide coupled to the output section of the ion channel, the exit guide to guide ions exiting the analyzer out of the ion mobility spectrometer. According to this aspect, the body can be made of an electrically insulating material. Further, also according to this aspect, the ion mobility spectrometer can also comprise an electrical signal source coupled to the electrodes, the electrical signal source being configured to generate, in distinct linear segments of the ion channel, distinct DC electric fields.

In another aspect, the present disclosure provides an ion mobility spectrometer that comprises: an analyzer, the analyzer having: a body made of a conductive material, the solid body defining an ion channel extending therethrough, the ion channel being continuous, the ion channel having a diameter that varies monotonically along the ion channel, the ion channel having an input section at a first end of the body and an output section at a second end of the body, the conductive material being configured to generate a confining field to confine ions in the ion channel along a central portion of the ion channel, the central portion extending parallel to the ion channel, the first end of the body and the second end of the body being configured to receive a DC voltage to generate an electric field in the ion channel. The analyzer further has electrodes set in the body along the ion channel and around the ion channel, the electrodes being arranged to receive an adjustable time-varying electrical signal, the time-varying electrical signal to generate a confining field to confine ions in the ion channel along a central portion of the ion channel, the central portion extending parallel to the ion channel, the electrodes being electrically isolated from the body. The ion mobility further comprises an entrance guide coupled to the input section of the ion channel, the entrance guide configured to guide ions to the ion channel; and an exit guide coupled to the output section of the ion channel, the exit guide to guide ions exiting the analyzer out of the ion mobility spectrometer.

In relation to at least some aspects of the present disclosure:

In some embodiments, the electrodes protrude in the ion channel. In other embodiments, the electrodes are flush with a wall of the ion channel.

In some embodiments, the diameter of the ion channel decreases continuously from the input section to the output section. In some cases, the ion channel diameter decreases linearly from the input section to the output section. In other cases, the diameter of the ion channel decreases quadratically from the input section to the output section. In yet other cases, the diameter of the ion channel decreases quadratically from the input section to the output section.

In other embodiments, the diameter of the ion channel decreases continuously from the output section to the input section. In some cases, the ion channel diameter decreases linearly from the output section to the input section. In other cases, the diameter of the ion channel decreases quadratically from the output section to the input section. In yet other cases, the diameter of the ion channel decreases quadratically from the output section to the input section.

In certain embodiments, the ion channel includes a plurality of segments each having a respective constant diameter different from the diameter of the other segments of the plurality of segments. In these embodiments, the ion channel includes one or more than one transition section, each segment of the plurality of segments is spaced apart from another segment of the plurality of segments by a respective one of the one or more than one transition section. In some cases, each transition section of the one or more than one transition section has a length parallel to the ion channel and a diameter that varies along the length of respective transition section.

In some embodiments, the ion mobility analyzer is such that the electrodes are perpendicular to the ion channel and are radially aligned with the ion channel. The electrodes can comprise groups of electrodes, each group of electrodes being in a respective plane that is perpendicular to the ion channel, each group of electrodes being spaced apart from the other groups of electrodes, along the ion channel. Each group of electrodes can consists of an even number of electrodes. The even number can be six or twelve.

The entrance guide can be an entrance funnel and, the exit guide can be an exit funnel.

The time-varying electrical signal can be a radio frequency (RF) electrical signal. The RF electrical signal can be a multipole RF signal.

The entrance guide can be configured to receive a flowing carrier gas and to provide the flowing carrier gas to the ion channel; and the monotonically varying diameter of the ion channel is configured to vary a speed of the flowing carrier gas as the flowing carrier gas traverses the ion channel. The ion spectrometer of the present disclosure can further comprise a source of carrier gas providing the flowing carrier gas. The source of carrier gas can be a source of reagent carrier gas. Or, the ion mobility spectrometer can include a source of reagent compound that provides the reagent compound for mixing with the flowing carrier gas.

The body of the analyzer can be a monolithic body or a composite body.

In another aspect, the present disclosure provides a method of analyzing ions, the method comprises: providing a flowing carrier gas to an ion channel, the ion channel having an input section and an output section, the flowing carrier gas is input at the input section, the flowing carrier gas containing the ions, the ion channel having a plurality of segments parallel to the ion channel, a speed of the flowing carrier gas being constant within each segment, the speed of the flowing carrier gas in a particular segment being different than the speed of the flowing carrier gas in any other segment, the speed of the flowing carrier gas changing monotonically along the ion channel, the flowing carrier gas generating a drag force on the ions, the drag force depending on the speed of the flowing carrier gas. The method further comprises: generating an electric field in the ion channel to produce an electric force acting on the ions, the electric force being in a direction opposite the direction of the drag force, the different speed of the flowing carrier gas in each segment of the ion channel and the electric force resulting is a separation of the ions along the ion channel. Additionally, the method comprises varying at least one of an amplitude of the electric field and the speed of the carrier gas in each segment of the ion channel to eject ions from the output section of the ion channel. In some embodiments, the method also comprises generating a time-varying electric field in the ion channel to confine the ions to a central region of the ion channel. Additionally, the method can comprise accumulating ions in the ion channel prior to varying at least one of an amplitude of the electric field and the speed of the carrier gas in each segment of the ion channel. The method can further comprise providing ejected ions to an ion characterization device such as, for example, a mass spectrometer. In further embodiments, the speed of the flowing carrier gas is greater in a segment of the plurality of segments closest to the output section than the speed of the flowing carrier gas in a segment of the plurality of segments closest to the input section.

Other aspects and features of the present disclosure will become apparent to those ordinarily skilled in the art upon review of the following description of specific embodiments of the disclosure in conjunction with the accompanying figures.

The foregoing summary provides some example aspects and features according to the present disclosure. It is not intended to be limiting in any way. For example, the summary is not necessarily meant to identify important or crucial features of the disclosure. Rather, it is merely meant to introduce some concepts according to the disclosure. Other aspects and features of the present disclosure are apparent to those ordinarily skilled in the art upon review of the following description of specific example embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides an ion mass spectrometer that has an ion channel shaped to modify the speed of a carrier gas as the carrier gas traverses the ion channel. In one case, the ion channel has segments of constant diameter in which the speed of the flowing gas is constant but different than the speed in other segments of the ion channel. This controlled variation in speed from segment to segment, together with the control of the axial electric field in the ion channel, together provide greater control on the separation of ions in the ion channel. Within the context of the present disclosure, the expression "linear velocity" is to be understood as meaning "linear speed" or simply "speed".

Figure 1:
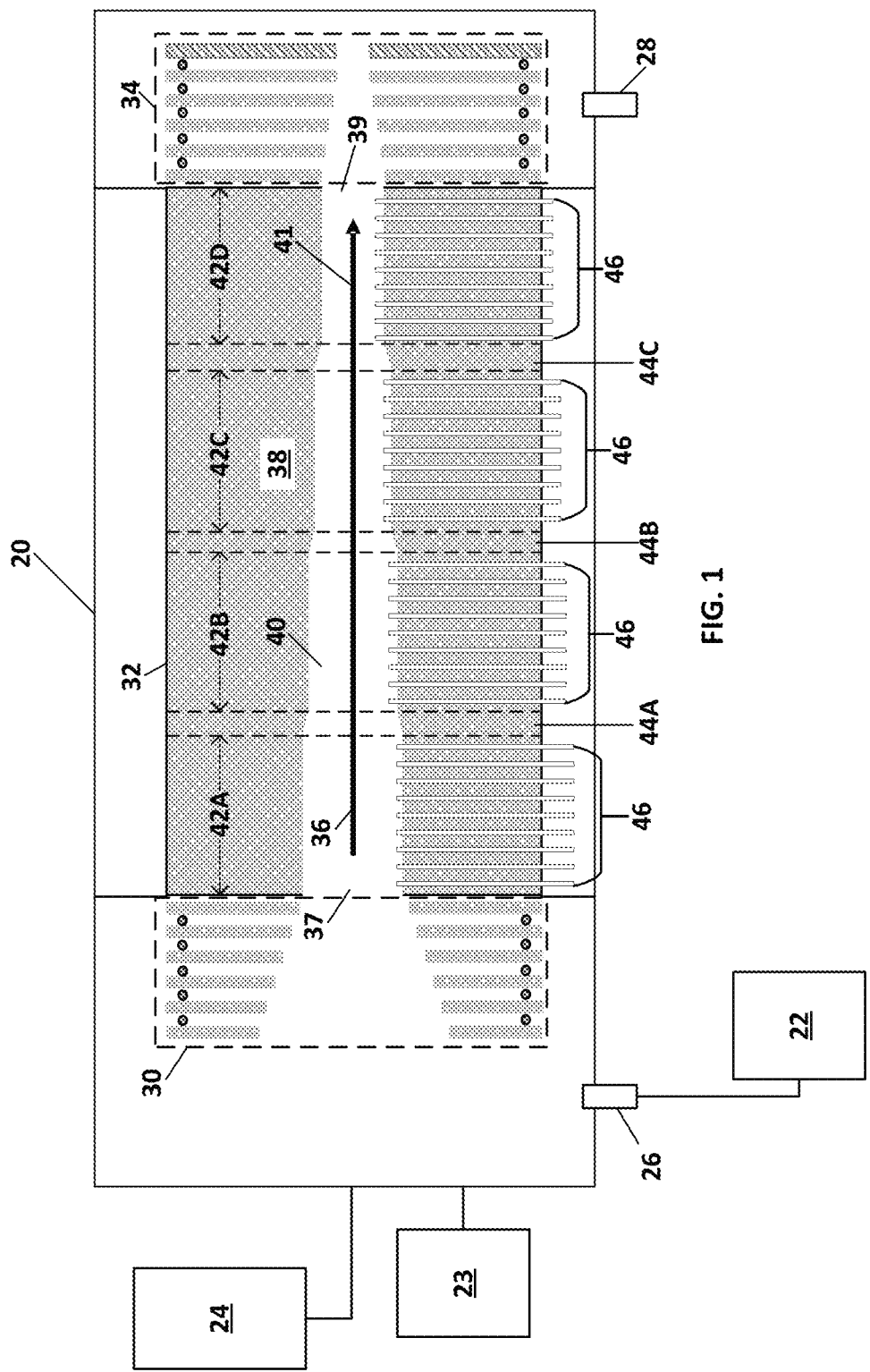
FIG. 1 shows a side, cross-sectional view of an embodiment of an ion mobility spectrometer (IMS) in accordance with the present disclosure.

FIG. 1 shows a side, cross-sectional view of an embodiment of an ion mobility spectrometer (IMS) 20 in accordance with the present disclosure. The IMS 20 is connected to an ion source 24 that provides ions to be analyzed to the IMS 20. Any suitable type of ion source can be used without departing from the scope of the present disclosure. For example, an electrospray ionization source can be used. Other types of ion sources include: a laser ablation ion source, a sputtering ion source, a discharge ion source, an inductively coupled plasma ion source, a matrix-assisted laser desorption/ionization ion source, etc.

The IMS 20 has an entrance guide 30, which is configured to guide the ions provided by the ion source 24 to an analyzer 32. The analyzer 32 is coupled to an exit guide 34, which is configured to output the ions analyzed by the analyzer 32 outside the IMS 20. The ions output from the exit guide 34 can be provided or coupled to, for example, a mass spectrometer, a Faraday cage, an electron multiplier, a photomultiplier, etc.

In the analyzer 32 of the present embodiment, the analyzer 32 has a body 38, made of an electrically insulating material that defines an ion channel 40, which extends through the body 38 from an input section 37 to an output section 39. The ion channel 40 has a diameter that, rather than being constant along the entire length of the ion channel 40, varies monotonically along the ion channel 40. In this example, the analyzer 32 has four segments 42A, 42B, 42C and 42D that each has a constant diameter different than the diameter of the other segments. Separating the segments 42A, 42B, 42C and 42D from each other are transition sections 44A, 44B and 44C, which each have a diameter that varies along the length the respective transition section.

Then analyzer can be of any suitable dimensions. For example, in some embodiments, the length of the analyzer can be about 120 mm. The length of the segments 42A, 42B, 42C and 42D can be 28 mm each, the length of transition sections 44A, 44B and 44C can be 2 mm each, and the width can be 34 mm. The diameter of segments 42A, 42B, 42C and 42D can be 14 mm, 12 mm, 10 mm and 8 mm respectively. In other embodiments, the IMS 20 can be miniature IMS fabricated using 3D printing. In other embodiments, the analyzer can be manufactured using 3D printing technology. In such embodiments, the analyzer can be manufactured as a body out of a poorly conductive material, so that an application of a potential difference (voltage) between the ends of the analyzer generates a DC electric field along the ion channel defined by the body. Examples of such poorly conductive materials include carbon, metal-loaded plastics, nanoparticles composites, etc. In such embodiments, the electrodes set in the body 38 are electrically isolated from the body 38 by, for example, providing an insulating material between the electrodes and the body.

Figure 2:
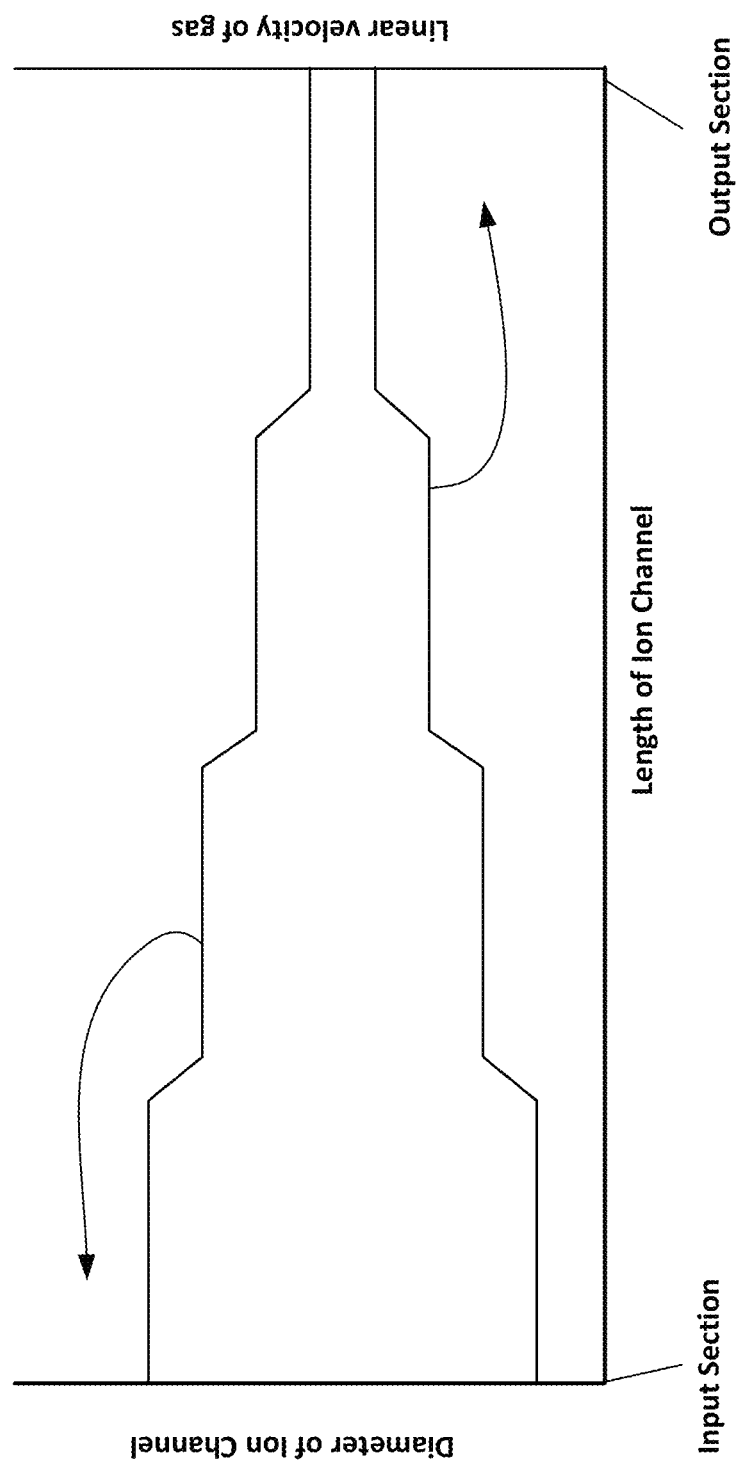
FIG. 2 shows a plot of the diameter of the ion channel of the IMS of FIG. 1, as a function of the length of the ion channel.

FIG. 2 shows an example of a plot of the diameter of the ion channel 40 as a function of the length of the ion channel 40. In every lengthwise portion of the ion channel, the diameter is either constant or decreasing, which is akin to a monotonic decreasing function. As such, the ion channel 40 has a diameter that varies monotonically along the ion channel 40. FIG. 2 also show a plot of the linear velocity of the flowing gas in each segment of the ion channel.

Returning to FIG. 1, the IMS 20 has a carrier gas inlet 26 and a carrier gas outlet 28. The carrier gas inlet in coupled to a carrier gas source 22. The pressure at the carrier gas inlet 26 is greater than the pressure at the carrier gas outlet 28. This difference in pressure causes the carrier gas to flow through the ion entrance guide 30, the ion channel 40 and the ion exit guide 34, in the direction indicated by the arrow 36.

The analyzer 32 further includes electrodes 46, which are discussed in detail further below. In general, the carrier gas can be un-reactive (for example, nitrogen, argon, etc.). However, any suitable carrier gas can be used. In some embodiments, reagent gases can be used to cause a chemical transformation of the ions being analyzed. In cases where dissimilar ions have the same mass to charge ratio and are difficult to differentiate, adding a reagent gas can result in modified ions that have different mobilities and that are more easily distinguishable than the pre-reaction ions. The reagent gas can include any suitable carrier gas to which reagent compounds are added. In some cases, the carrier gas can be reagent in itself. In other cases, the carrier gas can be water vapor, methanol, acetonitrile, etc. As will be understood by the skilled worker, the carrier gas, reagent gas and reagent compounds can be selected in accordance with the particular chemical properties of the ions being analyzed. In cases where the carrier gas is not by itself a reagent gas, reagent compounds can be added to the carrier gas in any suitable way. For example, reagent compounds can be added to the carrier gas source 22. Alternatively, the reagent compound can be provided by the ion source 24 in order to mix with the carrier gas prior to the gas traversing the ion channel 40. In other cases, a reagent compound source 23 can be coupled to IMS 20 and configured to provide reagent compounds to the IMS 20 in order for the reagent compounds to mix with the carrier gas prior to the gas traversing the ion channel 40.

In order to have a laminar flow of the carrier gas in the ion channel 40, and to minimize/avoid any turbulent flow of the carrier gas, the transition regions 44A, 44B and 44C are slopped from one segment to the next. The shape of the slope can be linear, as shown in FIG. 1, or can be curved. For example, the curve in the transition region can be similar to that of one side of a de Laval nozzle such that the thermal energy of the gas is more efficiently converted into kinetic energy along the flow axis. A sigmoidal curve or similar embodiment could also be an option.

Figure 3:
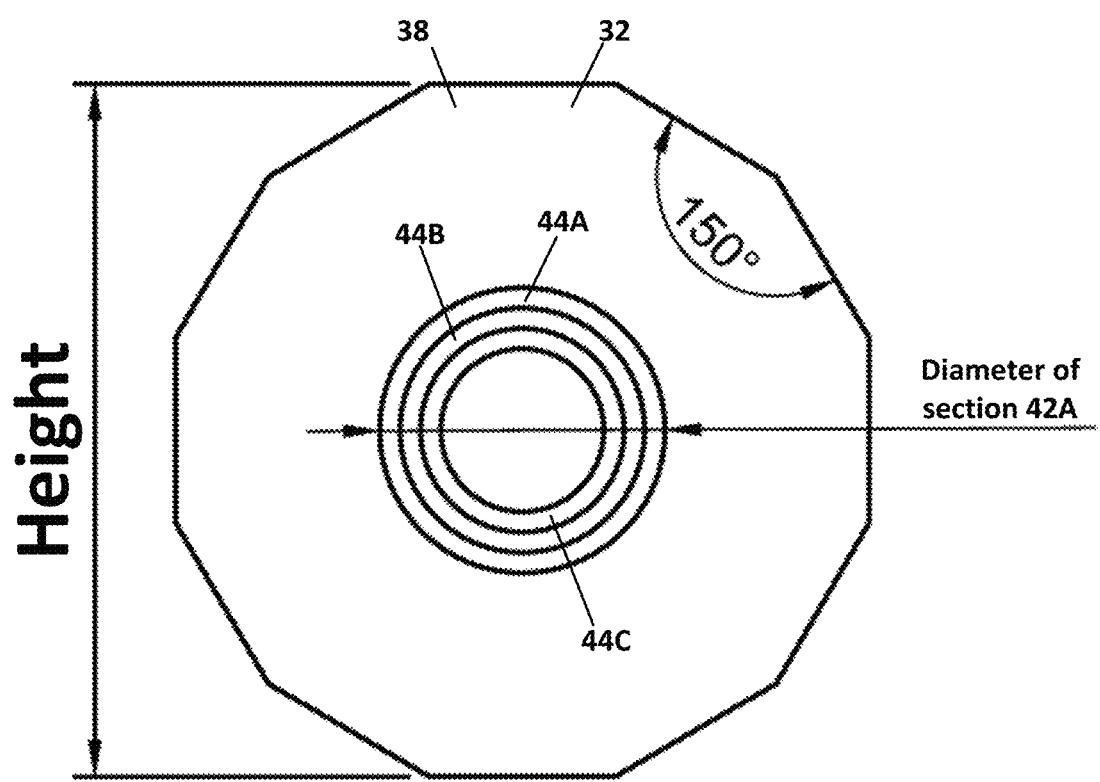
FIG. 3 shows an end view of the body of the IMS of FIG. 1, taken from the input section side.

FIG. 3 shows an end view of the body 38, taken from the input section side 37. The transition sections 44A, 44B and 44C are shown in the figure. The cross-section shown in FIG. 3 is perpendicular to the ion channel 40 and is, in the present example, dodecagonal. However, any suitable cross-section is to be considered within the scope of the present disclosure. For example, instead of a dodecagonal cross-section, the body 38 can have, perpendicular to the ion channel 40, a circular cross-section, a square cross-section, a hexagonal cross-section, etc. The electrodes 46 are not shown in FIG. 3.

Returning to FIG. 1, as the segments 42A, 42B, 42C and 42D have decreasing diameters, the speed at which the carrier gas traverses the segments 42A, 42B, 42C and 42D of the ion channel 40 will increase from one segment to the next. Any ion in the ion channel 40 will consequently move faster as it passes from one segment of the ion channel 40 to the next. Because of the moving carrier gas, any ion present in the ion channel 40 will be subjected to a drag force that increases as the speed (linear velocity) of the carrier gas increases.

To counteract the drag force exerted by the carrier gas on the ions present in the ion channel 40, the analyzer 32 has electrodes 46 set in the body 38. These electrodes are used to generate an electric field inside the ion channel 40. The electric field is to exert an electric force on the ions in the ion channel 40, in a direction parallel to the ion channel 40. The electric field is such that the electric force pushes the ions in the direction opposed to the direction in which the carrier gas flows in the ion channel 40.

The electrodes 46 are set along the ion channel 40 and around the ion channel 40. For clarity purposes, FIG. 1 shows electrodes 46 set only at the lower part of the ion channel.

Figure 4:
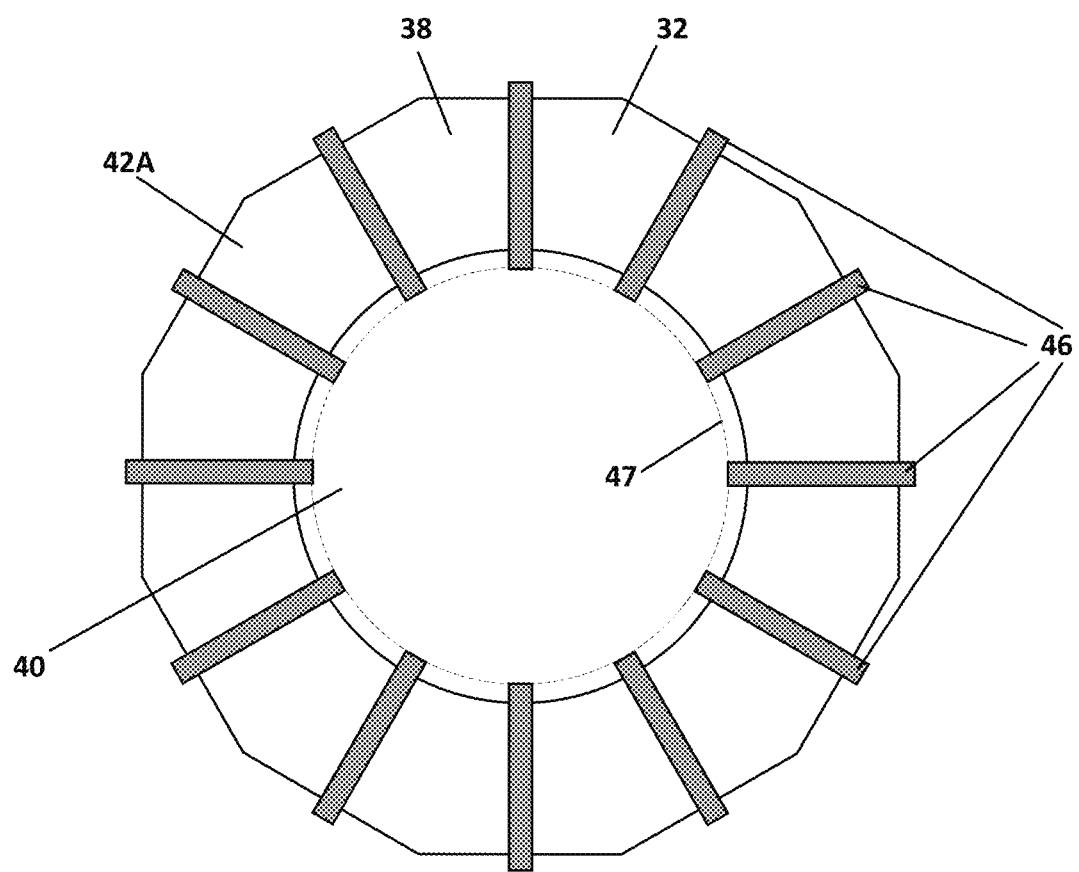
FIG. 4 shows a cross-section of the analyzer of the IMS of FIG. 1 with a group of electrodes set in the body 38.

FIG. 4 shows a cross-section of the analyzer 32 with a group of electrodes 46 set in the body 38, in segment 42A. In this embodiment, the twelve electrodes 46 of the group are radially aligned with to the ion channel 40 and are all in a same plane, which is perpendicular to the ion channel 40. Further, the electrodes 46 are angularly equi-spaced around the diameter of the ion channel 40. As will be understood by the skilled worker, analyzers that have a different number of electrodes or in which the electrodes are arranged differently than in the embodiment of FIG. 4 are to be considered within the scope of the present disclosure. As shown in this figure, the protruding electrodes define a circle 47 that has a diameter smaller than the diameter of the segment 42A.

Figure 5:
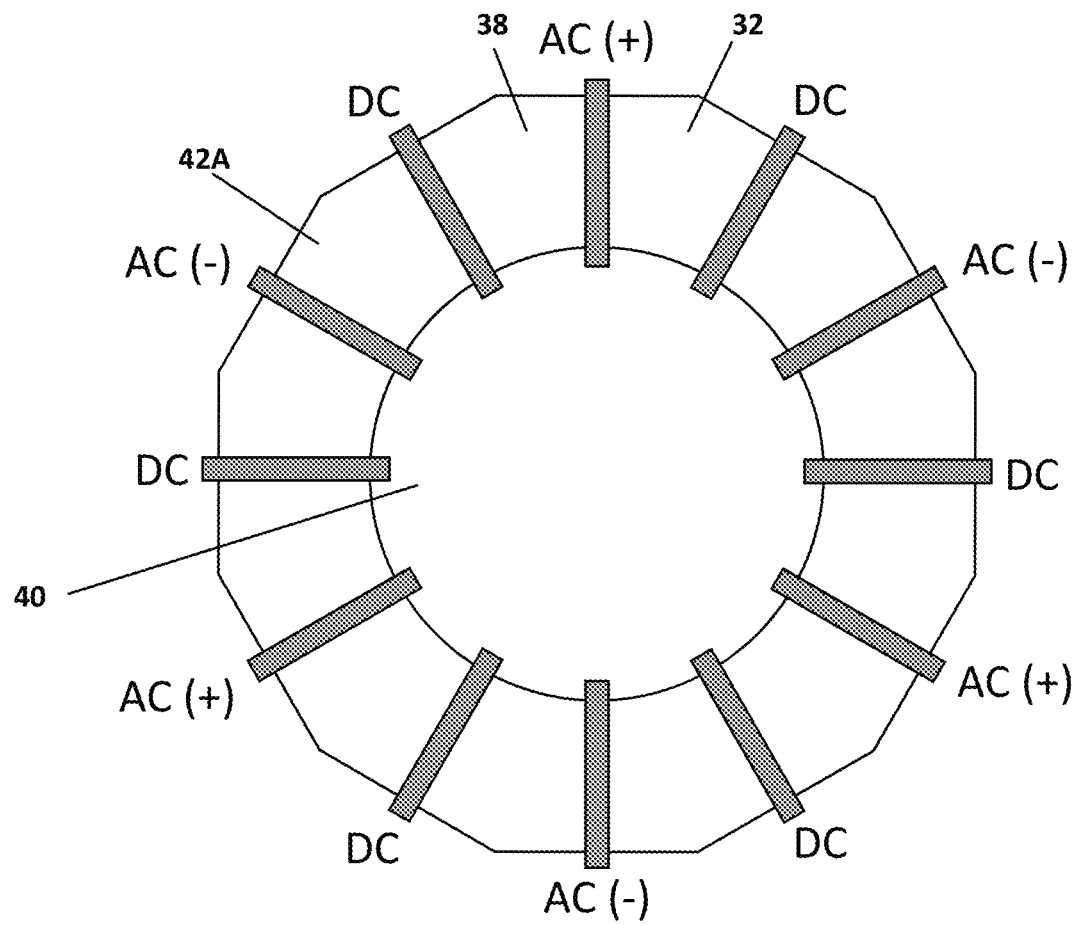
FIG. 5 shows the same cross-section of the analyzer as in FIG. 4, but with indications of where, on the group of electrodes, a DC electrical signal can be provided and where a time-varying electrical signal can be provided.
Figure 6:
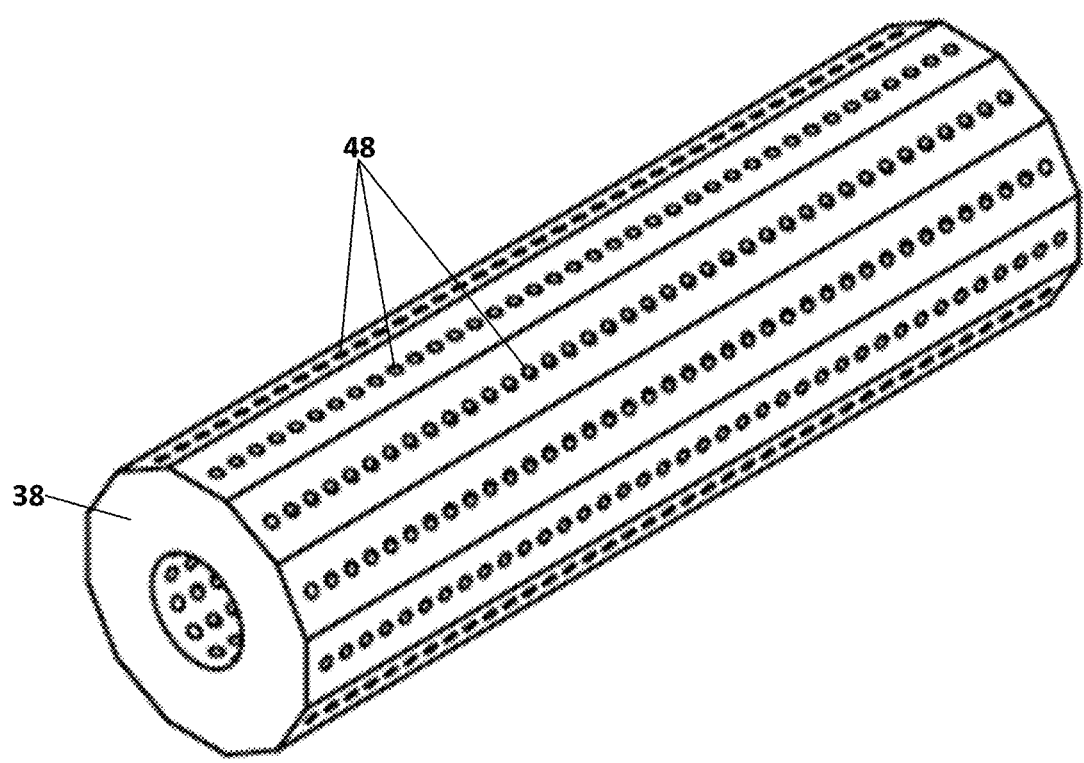
FIG. 6 shows a top perspective view of the body of the IMS of FIG. 1, with the apertures in which electrodes can be set.

FIG. 5 shows the same cross-section of the analyzer 32 as in FIG. 4, but with indications of where, on the group of electrodes 46, a DC electrical signal can be provided and where a time-varying electrical signal (e.g. AC(−) and AC(+)) can be provided. FIG. 6 shows a top perspective view of the body 38, with apertures 48. The electrodes 46 are configured to be set in the apertures 48 of the body 38.

Figure 7:
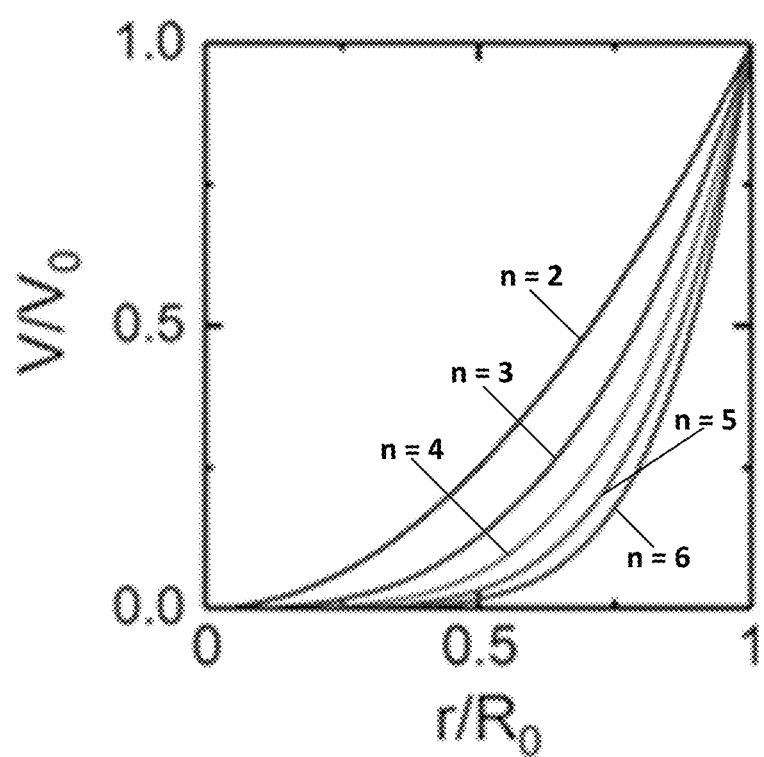
FIG. 7 shows the radial dependence of a multipole field for different orders of multipoles.

In the present example, when electrodes 46 are set in in the apertures 48 of the body 38 of FIG. 6, all the electrodes aligned with each other and with the ion channel 40 are subjected to the same electrical signal, which is the DC electrical signal or the time-varying electrical signal. When the time-varying electrical signal is an ideal two-dimensional multipole radio frequency (RF) electrical signal, the signal (V) can be expressed, in polar coordinates, as:

$$V(r, \phi, t) = V_0 \cos(n\phi)\left(\frac{r}{R_0}\right)^n \sin(\omega t)$$

Where $V_0$ is the RF amplitude, $R_0$ is the inscribed radius of the RF electrodes, and $\omega$ denotes the angular frequency. $V_0$ can have a value of a few hundreds of volts; in some embodiments, $V_0$ will not exceed 300 volts. $R_0$ can be of the order of 1 MHz or, as will be understood by the skilled worker, depending of the configuration of the analyzer, can have any other suitable value. "r" is the radial coordinate and "ϕ" is the angular coordinate. As will be understood by the skilled worker, in practice, the RF signal is created by 2n electrodes (i.e., for a quadrupolar field n=2, for a hexapolar field n=3, and so on). The radial dependence of the above described electric potential is plotted in FIG. 7. With increasing n, the confining RF field remains flatter and closer to zero further from the ion channel center axis. In other words, by increasing n, ions can occupy a larger near-zero field region near the ion channel center axis. This increases the relative number of ions which can be loaded into the analyzer and decreases space-charging effects which might limit mobility resolution.

In segments of the analyzer 32, there can be groups of twelve electrodes disposed as shown in FIG. 5. As will be understood by the skilled worker, this need not be the case. For example, if the diameter of a particular segment is sufficiently small to prevent reliably setting twelve electrodes therein, then fewer than twelve electrodes can be set. For example, six electrodes can be set instead of twelve. In other embodiments there can be more than twelve electrodes per group of electrodes.

Figure 8:
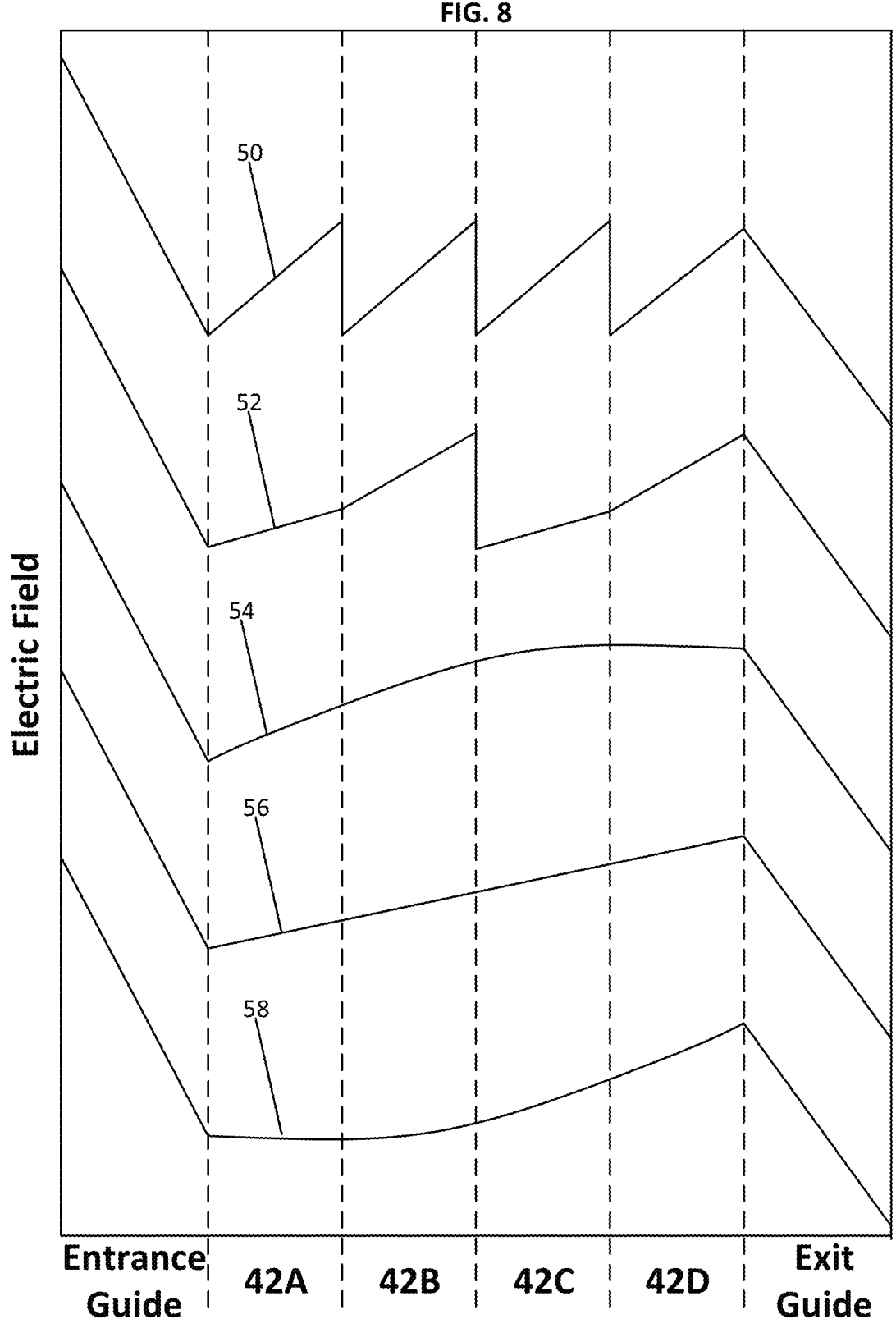
FIG. 8 shows examples of plots of electric fields that can be applied in the IMS of FIG. 1.

In the present embodiment, the DC electrical signal provided to the electrodes 46 can be different for each of the segments 42A, 42B, 42C and 42D, as shown by plot 50 in the graph of FIG. 8. This divides the analyzer 32 into four sectors which can be controlled individually. Dividing the mobility analyzer into independent sectors facilitates several new modes of operation. In the mode shown at plot 50, the analyzer 32 is employed as a series of four parallel flow ion mobility devices. This enables multiple simultaneous instances of ion separation and isolation for multiplexing measurements or for pre-concentrating analytes prior to detection (at a mass spectrometer for example). Of note, the variation of the speed along the ion channel 40 provides an additional degree of tuning of the analyzer 32.

In other modes of operation, multiple sectors can be combined and utilized as a single parallel flow device. One may then employ a linear DC ramp across several sectors while taking advantage of variation of the speed of the carrier gas in the segments 42A, 42B, 42C and 42D (see plot 56), or one can tune the voltages for the individual sectors to shape the electric field gradient across the device (e.g., approximate square root function in plot 54, or exponential function in plot 58). Further, it is possible to generate multiple shaped electric fields across the device as is shown in plot 52.

Figure 9:
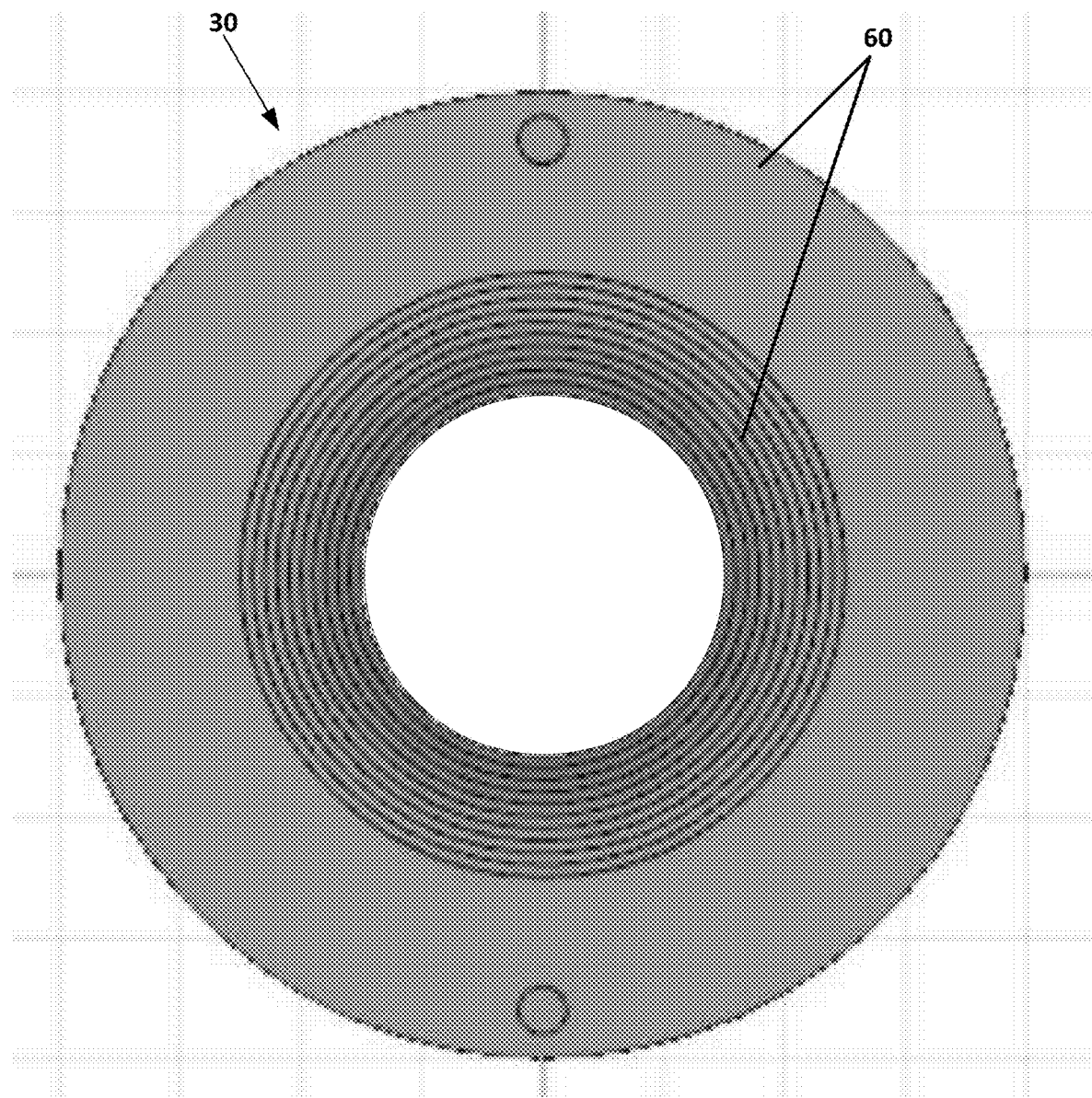
FIG. 9 shows an end view of the entrance guide of the IMS of FIG. 1.

FIG. 9 shows an end view of the entrance guide 30, which, in this embodiment, is funnel shaped. The entrance guide comprises a plurality of ring segments 60 concentrically aligned with each other, from the ring segment having the largest aperture to the ring segment having the smallest aperture. In the present embodiment, the exit guide 34 is, as the entrance guide 30, funnel shaped and looks similar to the entrance guide 30 shown in FIG. 9. The ion funnels of the entrance guide 30 and the exit guide 34 have a decreasing orifice size and decreasing applied voltage from the point where the ions enter to where they exit. There is also a dipolar RF applied between adjacent annular electrodes (i.e. longitudinal along the device axis). This acts as an ion lens, focusing ions down to a smaller cross-section at the funnel exit, resulting in higher ion transmission to the detector. The force applied by the funnel electric field is in the same direction as the gas/ion flow. Also, while the ions are radially confined in the funnel, an operator can select the mass range for confinement by tuning the voltages; when higher mass-to-charge (m/z) ratio species are selected, low m/z ion trajectories become unstable and these species are lost/neutralized.

Within the analyzer, there is a radial RF field (not a longitudinal RF field). This confines all m/z ions efficiently. By employing higher multipolar fields (for example, hexapole, octupole, etc.), this generates a relatively large low-field volume in the center of the analyzer 34 (the analyzer can also be referred to a mobility cell). This allows loading of the mobility cell with significantly more ions than prior art mobility cells (prior art analyzers), and it mitigates the effects of field-induced heating, which can lead to ion fragmentation that has a confounding effect in molecular determination. The DC voltage applied in the mobility cell (analyzer 34) opposes the direction of ion/gas flow. This, combined with the radial confinement, traps the ions in the region where the force provided by the opposing DC field perfectly counteracts the force applied by the gas flow.

The funnel-like electrode arrangement within the mobility cell (analyzer 34) is used to ensure that the electric field gradient matches the gas flow gradient throughout the mobility cell.

Figure 10:
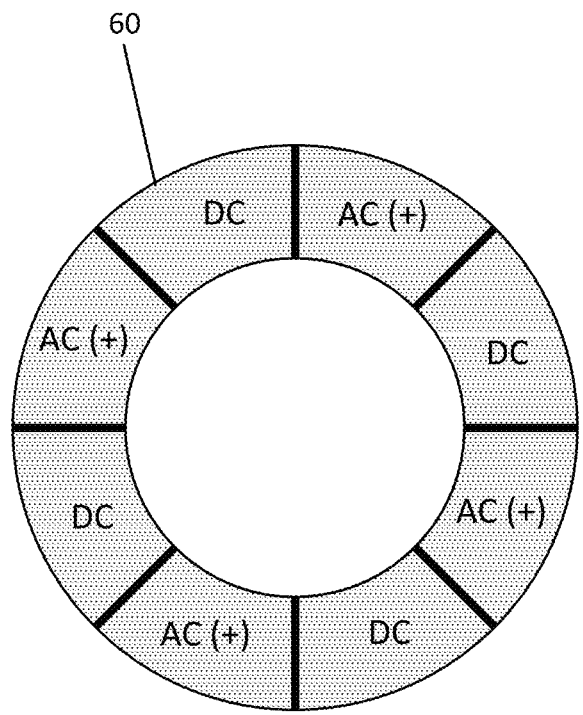
FIG. 10 shows a segment of the entrance guide of FIG. 9, divided in eight sections configured to receive either a DC electrical signal or an AC electrical signal
Figure 11:
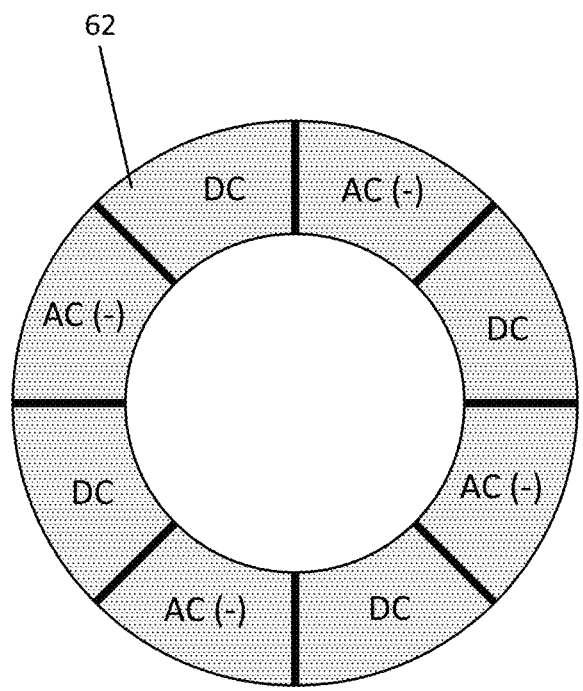
FIG. 11 shows a segment of the exit guide of the IMS of FIG. 1, divided in eight sections configured to receive either a DC electrical signal or an AC electrical signal.

FIG. 10 shows a segment 60 of the entrance guide 30 divided in eight sections configured to receive either a DC electrical signal or an AC electrical signal. FIG. 11 shows a segment 62 of the exit guide 30 divided in eight sections configured to receive either a DC electrical signal or an AC electrical signal.

Figure 12:
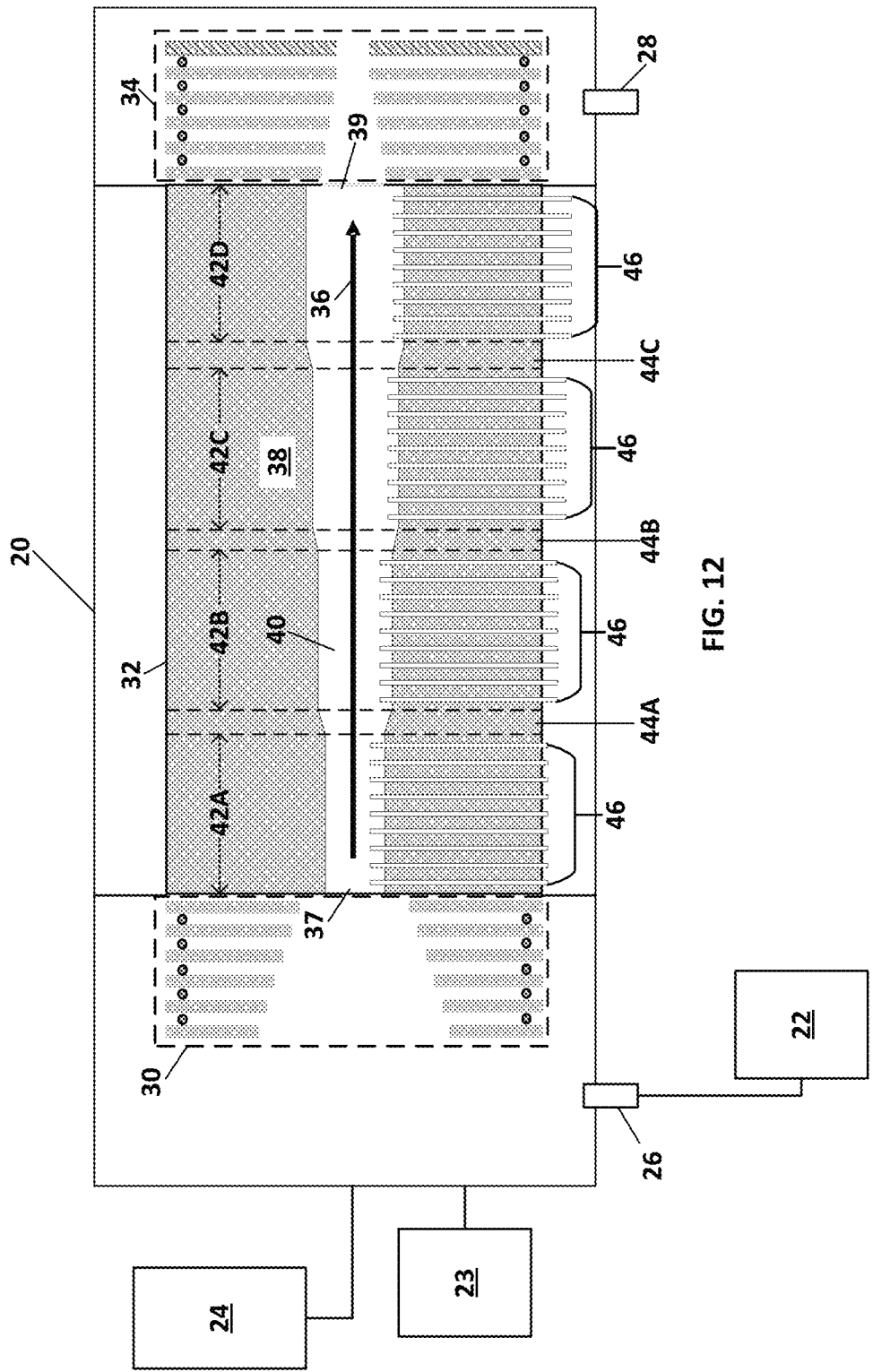
FIG. 12 shows another embodiment of the IMS of the present disclosure.

FIG. 12 shows another embodiment of an IMS 20 in accordance with the present disclosure. The embodiment of the IMS 20 of FIG. 12 is similar to the embodiment shown in FIG. 1, except that the orientation of the ion channel 40 in FIG. 12 is opposite from the one in FIG. 1.

Figure 13:
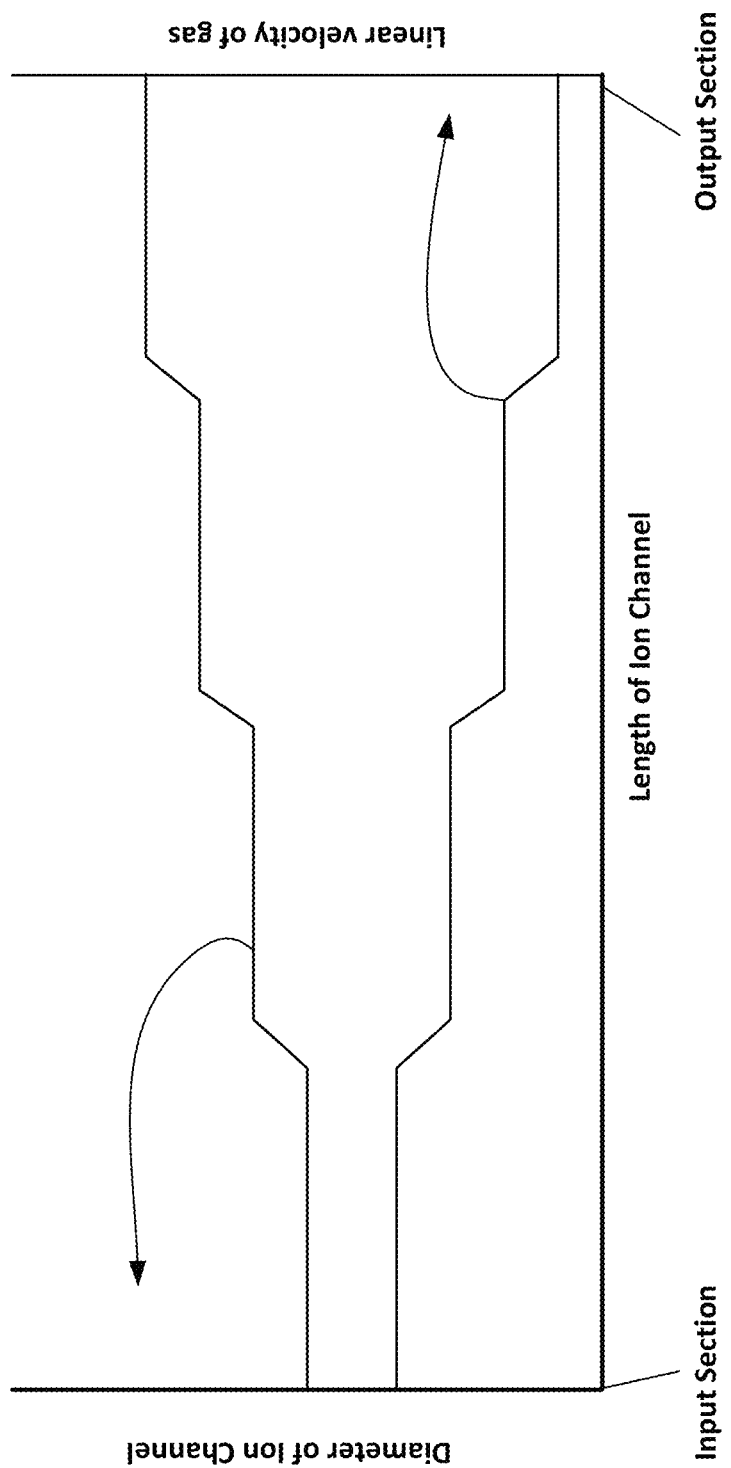
FIG. 13 shows a plot of the diameter of the ion channel of the IMS of FIG. 12, as a function of the length of the ion channel.

FIG. 13 shows an example of a plot of the diameter of the ion channel 40 as a function of the length of the ion channel 40 for the embodiment of FIG. 13. In every lengthwise portion of the ion channel, the diameter is either constant or increasing, which is akin to a monotonic increasing function. As such, the ion channel 40 has a diameter that varies monotonically along the ion channel 40. FIG. 13 also show a plot of the linear velocity of the flowing gas in each segment of the ion channel.

Figure 14:
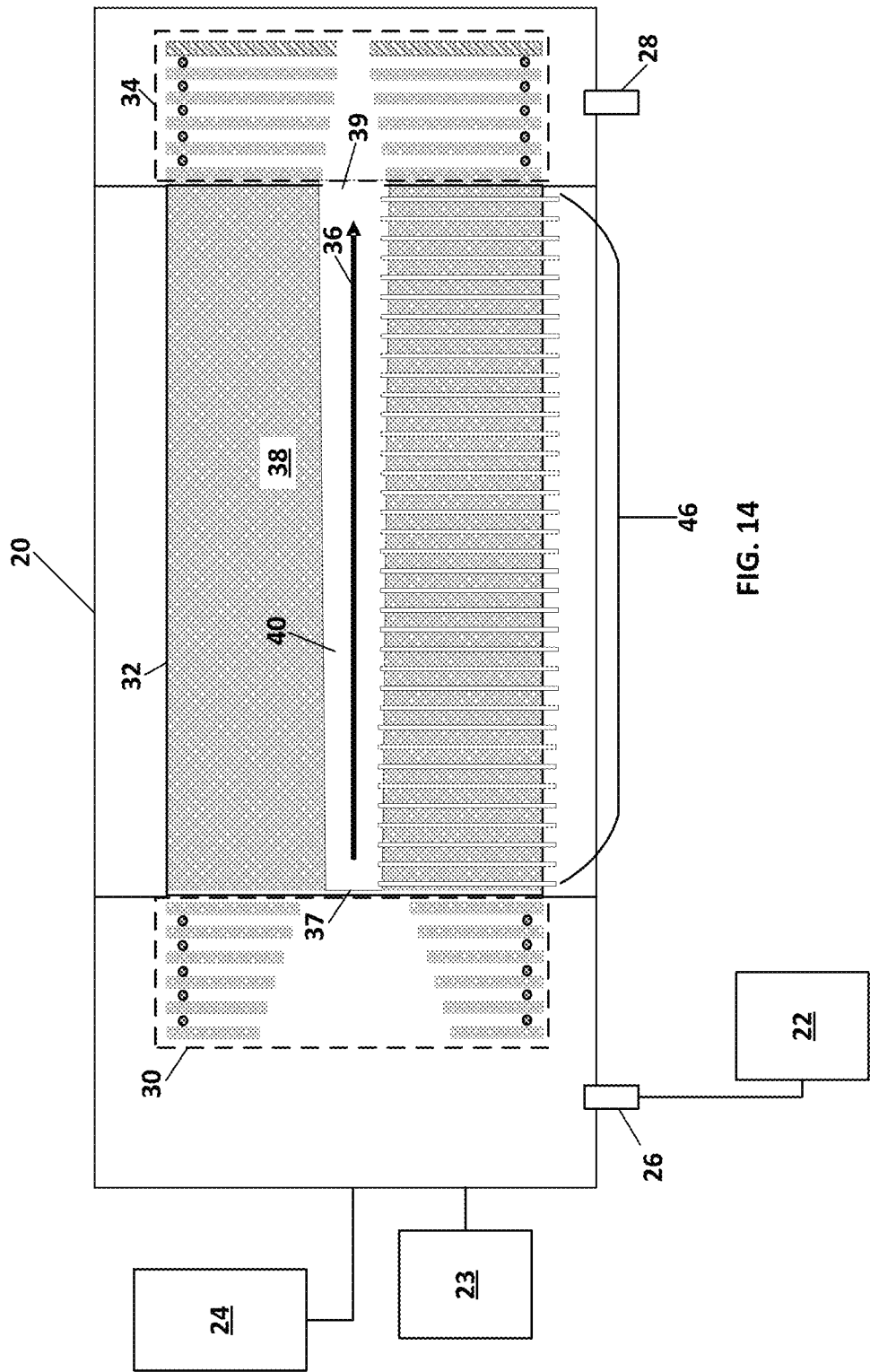
FIG. 14 shows a further embodiment of the IMS of the present disclosure.

FIG. 14 shows another embodiment of an IMS 20 in accordance with the present disclosure. The embodiment of the IMS 20 of FIG. 14 is similar to the embodiment shown in FIG. 1, except that the ion channel 40, rather than having segments of constant diameter, has an ion channel 40 that that is continuously slopped.

Figure 15:
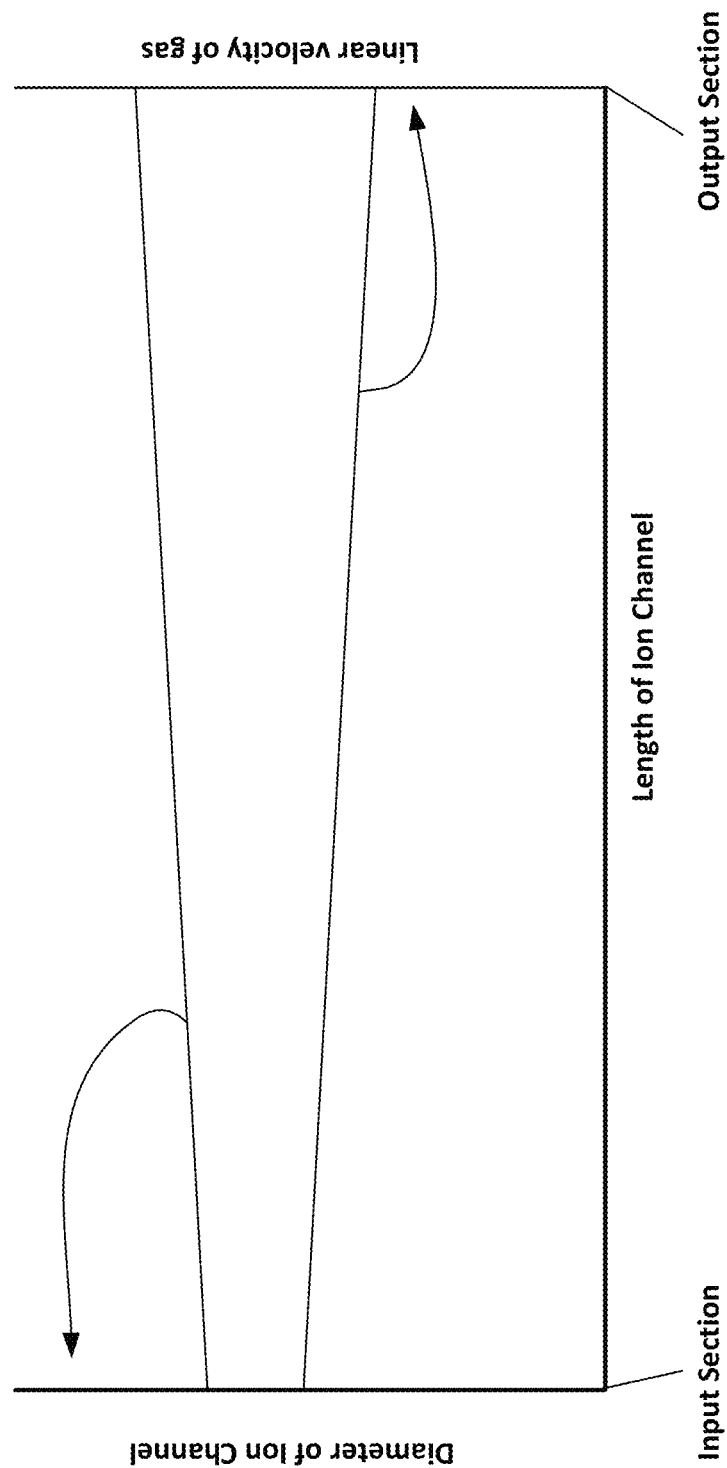
FIG. 15 shows a plot of the diameter of the ion channel of the IMS of FIG. 14, as a function of the length of the ion channel.

FIG. 15 shows an example of a plot of the diameter of the ion channel 40 as a function of the length of the ion channel 40 for the embodiment of FIG. 14. All along the ion channel 40, the diameter of the channel increases, which is akin to a monotonic increasing function. As such, the ion channel 40 has a diameter that varies monotonically along the ion channel 40. FIG. 15 also show a plot of the linear velocity of the flowing gas in the ion channel.

Figure 16:
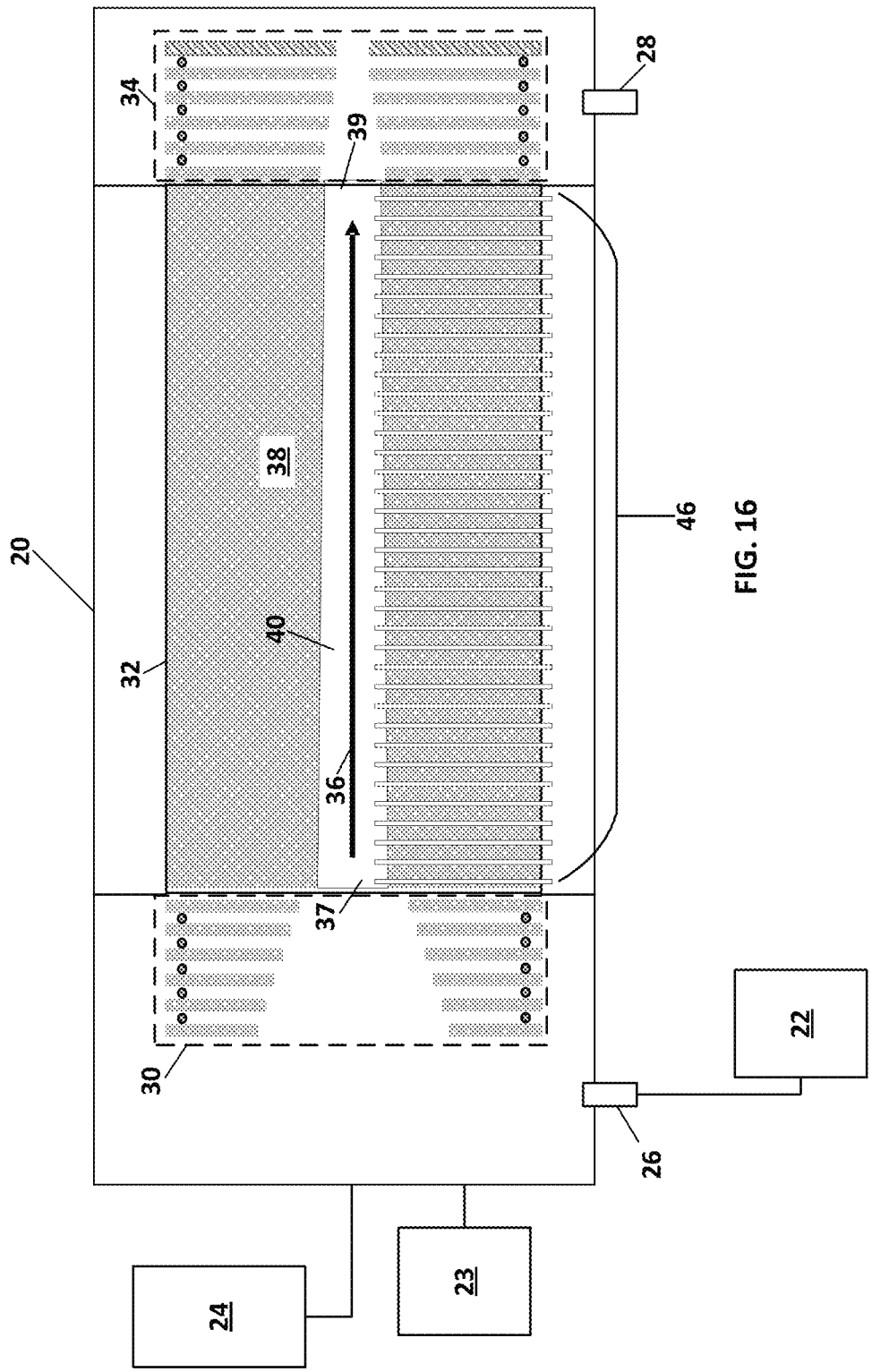
FIG. 16 shows an additional embodiment of the IMS of the present disclosure.

FIG. 16 shows another embodiment of an IMS 20 in accordance with the present disclosure. The embodiment of the IMS 20 of FIG. 16 is similar to the embodiment shown in FIG. 14, except that the diameter of the ion channel 40 is larger at the input section 37 than at the output section 39.

Figure 17:
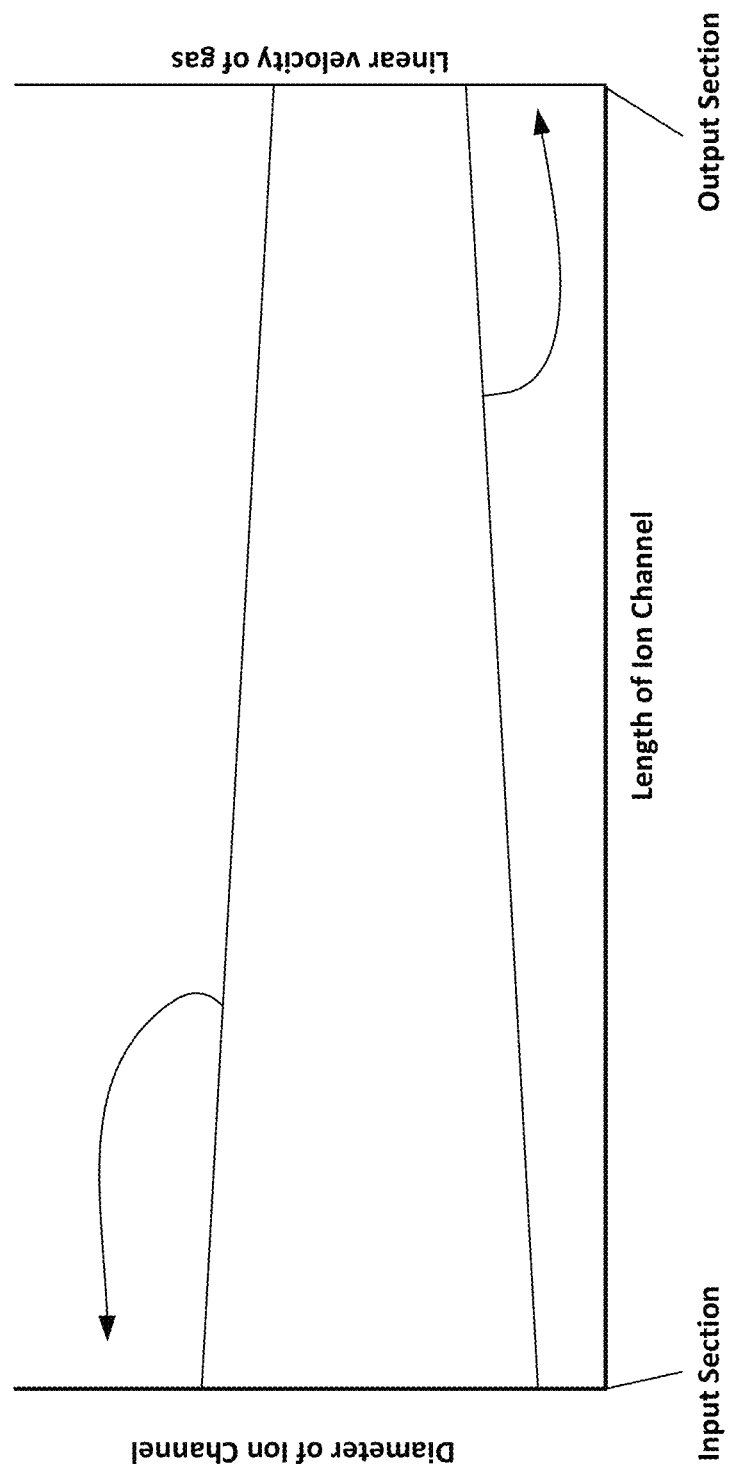
FIG. 17 shows a plot of the diameter of the ion channel of the IMS of FIG. 14, as a function of the length of the ion channel.

FIG. 17 shows an example of a plot of the diameter of the ion channel 40 as a function of the length of the ion channel 40 for the embodiment of FIG. 16. All along the ion channel 40, the diameter of the channel decreases, which is akin to a monotonic increasing function. As such, the ion channel 40 has a diameter that varies monotonically along the ion channel 40. FIG. 15 also show a plot of the linear velocity of the flowing gas in the ion channel.

In the embodiments of FIGS. 14 and 16, the diameter of the ion channel 40 varies linearly from the input section 37 to the output section 39. In other embodiment, the diameter of the ion channel could vary quadratically or in accordance with any other suitable function, from the input section 37 to the output section 39.

In all the embodiments disclosed herein, the electrodes 46 protrude in the ion channel 40. This need not be the case. In other embodiments, instead of protruding in the ion channel 40, the electrodes 46 are flush with the wall of the ion channel 40. In yet other embodiments, the electrodes 46 protrude in the ion channel 40 but, the protruding portion of the electrodes 46 can be coated with any suitable insulator film. Any embodiment that has electrodes set in the body 38 and that produces a confining field along the central portion 41 of the ion channel 40 is within the scope of the present disclosure. The central portion 41 is shown in FIG. 1 and is centered around the central axis of the ion channel 40. The central axis is collinear with the arrow 36.

Having the electrodes 46 flush with the ion channel 40 can improve the laminar flow condition of the carrier gas. By covering the electrodes 46 with a thin insulator film, they are protected from corrosion/degradation.

In all the embodiments presented above, the ion channel 40 is described as being defined by a body 38. The body can be a monolithic body or, the body can be made of multiple parts secured together to define the ion channel. Such a body can be referred to as a composite body. Depending on the embodiments, the body 38 can be made of an electrically insulating material or of conductive material.

Preferably, the electrodes 46 are highly conductive and relatively inert. Gold or stainless steel are two options of material that can be used for the electrodes 46.

When the electrodes 46 set in the body 38 are not separated from the body with an electrical insulator, the material used for the body 38 is an electrically insulating material such as, for example, a plastics (PEEK, PTFE, etc.) or machinable ceramics (for example, Macor™) are suitable.

When the material of body 38 is made of an insulator material, DC and time-varying electric fields can be applied by using the electrodes 46 set in the body 38 as showed in the embodiment of FIG. 1. Alternatively, the body of the ion channel can be made of conductive material of high resistivity. In such embodiments, passing DC current through the body 38 will produce a DC voltage gradient along the ion channel 40. The shape of the DC electric field along the channel will correspond to the resistance along the body of the ion channel 40. The AC field can be introduced by embedded electrically isolated electrodes in the body of the ion channel or it can be introduced via an external RF induction circuit coupled to the analyzer 34 and to the ion channel 40. The latter approach can be better when attempting to generate an RF field in the ion channel of a miniature analyzer produced by 3D printing.

Figure 18:
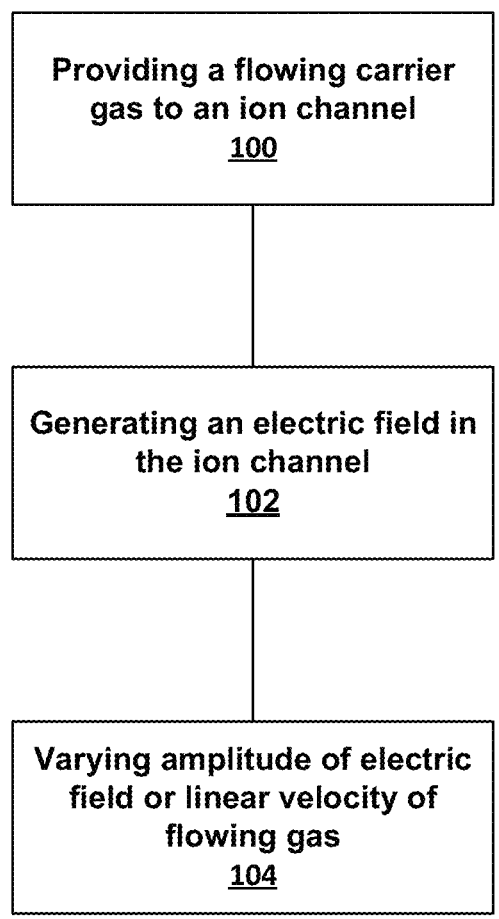
FIG. 18 shows a flowchart of an embodiment of a method in accordance with the present disclosure.

FIG. 18 shows a flowchart of a method of analyzing ions in accordance with the present disclosure. At step 100, a flowing carrier gas is provided to an ion channel. The ion channel has an input section and an output section and the flowing carrier gas is input at the input section. The flowing carrier gas containing the ions. The ion channel has a plurality of segments parallel to the ion channel and a speed of the flowing carrier gas is constant within each segment but, the speed of the flowing carrier gas in a particular segment is different than the speed of the flowing carrier gas in any other segment of the ion channel. The speed of the flowing carrier gas changes monotonically along the ion channel. The flowing carrier gas generates a drag force on the ions and the drag force depends on the speed of the flowing carrier gas. Examples of such an ion channel are shown at FIGS. 1, 12, 14 and 16.

Returning to FIG. 18, at step 102, an electric field is generated in the ion channel to produce an electric force acting on the ions. The field is such that the electric force is in a direction opposite the direction of the drag force. The different speed of the flowing carrier gas in each segment of the ion channel and the electric force result is a separation of the ions along the ion channel.

At step 104, a variation of at least one of an amplitude of the electric field and the speed of the carrier gas in each linear segment of the ion channel is effected in order to eject ions from the output section of the ion channel.

Additionally, a step of generating a time-varying electric field in the ion channel to confine the ions to a central region of the ion channel can be performed. Further, ions can be accumulated ions in the ion channel prior to varying at least one of an amplitude of the electric field and the speed of the carrier gas in each segment of the ion channel.

Further, the ejected ions can be provided to an ion characterization device. For example, a mass spectrometer.

Furthermore, in some embodiments of the method, the form of the ion channel can be such that the speed of the flowing carrier gas is greater in a segment of the plurality of segments closest to the output section than the speed of the flowing carrier gas in a segment of the plurality of segments closest to the input section.

As detailed above, the present disclosure provides an ion mass spectrometer that has an ion channel shaped to modify the speed of a carrier gas as the carrier gas traverses the ion channel. In one case, the ion channel has segments of constant diameter in which the speed of the flowing gas is constant but different than the speed in other segments of the ion channel. The controlled variation in speed from segment to segment, together with the control of the axial electric field in the ion channel, provide greater control on the separation of ions in the ion channel.

In another aspect according to the present disclosure, direct coupling of a sample preparation, such as solid phase microextraction (SPME), to ion spectrometric techniques such as ion mobility spectrometry (IMS) would benefit from focusing techniques in an attempt to achieve optimum sensitivity as the desorption time from SPME device is much longer compared to determination time by conventional IMS. Accordingly, the present disclosure provides example devices and techniques for facilitating focusing of ions in an ion mobility drift tube. This may be accomplished by an accumulation of the ions at a characteristic place or region along the tube for a given ion, where the mobility of the ion driven by electric field is balanced by a drift gas linear flow rate. In an embodiment, an ion mobility spectrometer may have an analyzer, where the analyzer comprises a body defining an ion channel therethrough. The analyzer body with the ion channel may be referred to as an ion mobility drift tube.

In addition to focusing ions within a channel, a device may have a high-resolution feature such that both a linear fluid flow gradient and an opposing DC electric field may be generated in the analyzer. In an embodiment, the linear fluid flow gradient and the opposing DC electric field may be generated uniformly in the separation device. This may be accomplished by using resistive material, for instance in the form of a resistive conductor, along an ion channel having a changing internal diameter. For example, the channel may have some form of a tapered shape, which generally means that the analyzer body defines the ion channel to have a diameter that varies monotonically along the ion channel. Passing current through the resistive material will generate an electric field opposing the flow of ions contained in a drift gas and therefore facilitate focusing ions at appropriate positions in the channel according to their mobility. In an embodiment, the resistance of the resistive material should be high so that not much heat is generated during operation. In an embodiment, cooling of the drift gas, cooling of the channel, or cooling of the body or analyzer, can be incorporated to prevent the temperature in the channel from rising too much or at all. In an embodiment, the ion mobility analyzer may be configured to control a temperature in the drift tube to be substantially below the ambient temperature. This may be done by cooling the tube in any suitable way, for example by using any suitable cooling device or system, or other cooling technique. In addition, lowering of the drift gas temperature may increase resolution as lower thermal energy of ions would result in lower dispersion of the focused ion bands in the ion channel and therefore should, in at least some embodiments, result in sharper, narrower separated zones facilitating better resolution.

In an embodiment, the resistive material may have a uniform resistance along the ion channel resulting in a substantially uniform electric field as the tapered ion channel and generated linear flow velocity gradient would facilitate the effect of focusing of ions in the channel. In another embodiment, a diameter of the ion channel may be constant, meaning the diameter does not change along the length of the channel. The resistive material have a gradient of resistivity along the channel to produce an electric field gradient facilitating the focusing effect. In addition, in an embodiment, an application of gradients in the electric field and the fluid flow, for example by using a tapered ion channel, at the same time may be used to improve performance of the separation device as mentioned above.

In an embodiment, the analyzer may be miniaturized, which may result in a low-cost device that is able to perform convenient on-site direct multicomponent determination tasks when combined with SPME technology.

In some previously described embodiments described above in relation to other aspects of the present disclosure, an analyzer has a plurality of discrete electrodes arranged at spaced apart locations along and perpendicular to a length of the ion channel. For example, FIG. 1 and FIG. 4 show an embodiment(s) in which an analyzer 32 has a group of electrodes 46 set in the body 38, in segment 42A. In this embodiment, the twelve electrodes 46 of the group are radially aligned with to the ion channel 40 and are all in a same plane, which is perpendicular to the ion channel 40.

In these previously described embodiments, improving the uniformity of the electric field and therefore improving the resolution obtained by the analyzer could require increasing the number of electrodes along the channel, for example to reduce the spacing between electrodes along the length of the ion channel, which may be difficult to accomplish practically.

According to an aspect of the present disclosure, another way of improving the uniformity of the electric field and therefore improving the resolution obtained by the analyzer, which may be more convenient, is to produce a uniform continuum of electric field. A uniform continuum of electric field may generated by a resistive conductor, which may comprise one or more conductor elements, having a uniform or substantially uniform resistance along the longitudinal axis of the ion channel. The resistive conductor may extend along the ion channel and may be configured to generate an electric field along the ion channel when a DC signal is applied across the resistive conductor. The resistive conductor may be separate from the body. The DC signal may be adjustable. This may provide for a similar effect as having an infinite number of electrodes spaced side by side. Such an arrangement may provide for improved resolution since both the opposing field (e.g. electric field) and the driving field (e.g. velocity gradient) may be highly uniform.

The resistive conductor may have any suitable shape or form. In an embodiment, the resistive conductor comprises a plurality of elongate resistive conductor elements disposed at the body in the ion channel and extending along the ion channel. Being disposed at the body in the ion channel may mean in contact with the body, or proximate to the body. In an embodiment, it may mean fully or partially embedded in the body. The elongate resistive conductor elements may be of any suitable shape or form. For example, they may be in the form of wires or strips. In an embodiment, the resistive conductor may be in the form of, or comprise, a coating including a resistive material disposed at the body in the ion channel.

Figure 19:
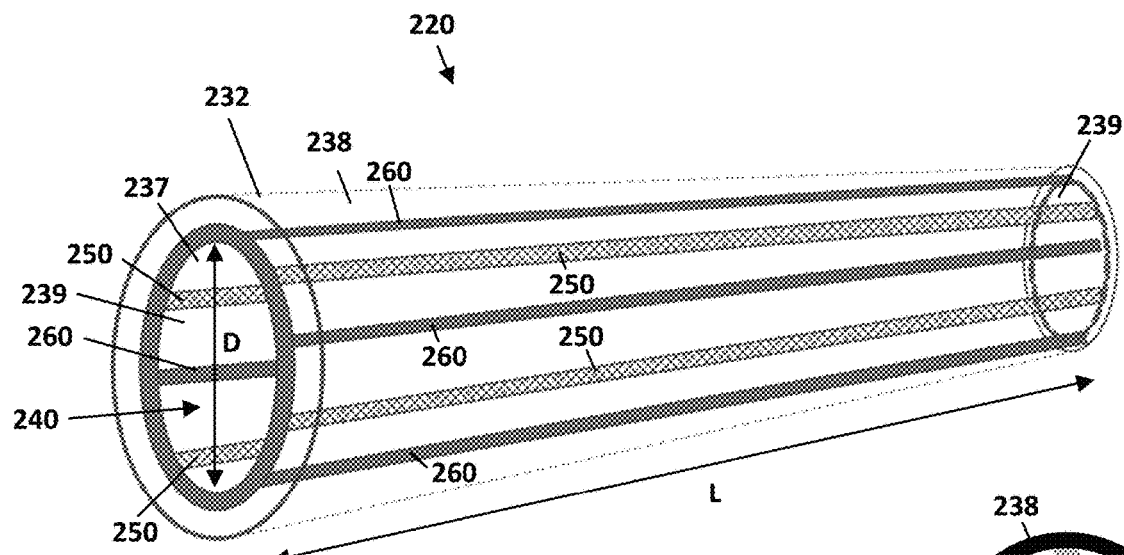
FIG. 19 is a perspective view of a representation of an example embodiment of an ion mobility spectrometer.

FIG. 19 is a perspective view of a representation of an example embodiment of an ion mobility spectrometer (IMS) 220 in accordance with the present disclosure. IMS 220 may be similar in many regards to IMS 20 shown, for example, in FIGS. 1 and 3-5. Accordingly, some differences are described herein as opposed to describing the entire IMS again.

Analyzer 232 has a body 238 that defines an ion channel 240 extending therethrough generally between an input section 237 for receiving ions and an output section 239 for outputting ions.

In this embodiment, ion channel 240 has a diameter D that varies monotonically along the length L of ion channel 240 rather than being constant along the length L of ion channel 240. In this embodiment, diameter D decreases monotonically from input section 237 to output section 239. In an embodiment, body 238 defines ion channel 240 to have a diameter D that varies monotonically along at least part of the length L or the entire length L ion channel 240.

Furthermore, body 238 may be made of, or comprise, an electrically insulating material that defines an ion channel 240. In another embodiment, body 238 may be made of a material(s) and an electrically insulating material may be disposed between body 238 and the resistive conductor to electrically insulate the resistive conductor from body 238, for example if body 238 is not made of an electrically insulating material(s). Body 238 may be made in any suitable manner, for example using casting, a mold, machining, of 3D printing.

In addition, a resistive conductor may extend along ion channel 240 and may be configured to generate an electric field along ion channel 240 when a DC signal is applied across the resistive conductor. The resistive conductor may be separate from body 238, meaning the resistive conductor is not part of, or otherwise formed as part of, body 238. In this embodiment, the resistive conductor comprises a plurality of elongate resistive conductor elements 250 disposed at body 238 in ion channel 240 and extending along ion channel 240 in a direction along its length L. The resistive conductor extends along ion channel 240 and is configured to generate an electric field along ion channel 240 when a DC signal is applied across the resistive conductor, which in this example embodiment is the elongate resistive conductor elements 250. Accordingly, the DC signal may be applied across each of elongate resistive conductor elements 250 to generate an electric field along the ion channel 240.

Figure 20:
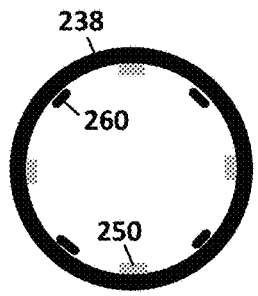
FIG. 20 is a cross sectional view of an embodiment, similar to the one of FIG. 19, showing elongate resistive conductor elements and electrodes producing AC field disposed radially around a longitudinal axis of the ion channel in a spaced-apart arrangement.

The plurality of elongate resistive conductor elements 250 may comprise at least four elements, or any other suitable number, and elongate resistive conductor elements 250 may be disposed radially around a longitudinal axis of the ion channel in a spaced-apart arrangement. FIG. 20 is a cross sectional view of an embodiment, similar to the one of FIG. 19, showing elongate resistive conductor elements 250 disposed radially around a longitudinal axis of the ion channel in a spaced-apart arrangement.

Elongate resistive conductor elements 250 may be attached to a surface 239 of body 238 defining the ion channel 420. Being attached to a surface 239 of body 238 includes being directly or indirectly coupled to surface 239 using attachment means such as adhesive, one or more connector devices, or any other suitable attachment technique.

The resistive conductor, such as elongate resistive conductor elements 250, may consist of or comprise any suitable material(s). For example, it may consist of or comprise a composite of conductive materials, such as silver or conductive particles in non-conducive material such as non-conductive polymer, such as epoxy or PDMS and any other suitable material.

In an embodiment, body 238 may comprise a plurality of electrodes 260 extending along ion channel 240 and configured to generate a confining field when a time-varying electrical signal is applied to the plurality of electrodes 260. The confining field may be provided for confining ions in ion channel 240 along a central portion of the ion channel. The confining field may be used to force the ions into the center of channel 240. The plurality of electrodes 260 may be disposed at body 238 in ion channel 240. Being disposed at body 238 in ion channel 240 may mean in contact with body 238, or proximate to body 238. In an embodiment, being disposed at body 238 may mean fully or partially embedded in body 238. The elongate resistive conductor elements may be of any suitable shape or form. For example, they may be in the form of wires or strips. The plurality of electrodes 260 may disposed radially around a longitudinal axis of the ion channel, as shown in FIG. 19. The plurality of electrodes 260 may comprise at least four electrodes, or any other suitable number, and electrodes 260 may be disposed radially around a longitudinal axis of the ion channel in a spaced-apart arrangement, as shown in FIGS. 19 and 20.

The time-varying electrical signal may be a radio frequency (RF) electrical signal. The RF electrical signal may be a multipole RF signal.

The plurality of electrodes 260 may be made of any suitable material(s). In an embodiment, the plurality of electrodes 260 comprises wires or strips. Electrodes 260 may be made of a material(s) having a low reactance.

It is noted that FIG. 19 shows some of resistive conductor elements 250 and electrodes 260 through body 238 for illustrative purposes. It is to be appreciated that unless body 238 is made of a transparent material, it would not be possible to actually see elements 250 or electrodes 260 through body 238.

In an embodiment, the monotonically varying diameter of ion channel 240 may decrease substantially continuously, substantially linearly, or substantially quadratically from input section 237 to output section 239. In an embodiment, body 238 defines ion channel 240 to include a plurality of segments each having a respective substantially constant diameter different from the diameter of the other segments of the plurality of segments. In an embodiment, body 238 defining channel 240 may be shaped in any suitable way, including similar to the shapes of other embodiments described herein.

Figure 21:
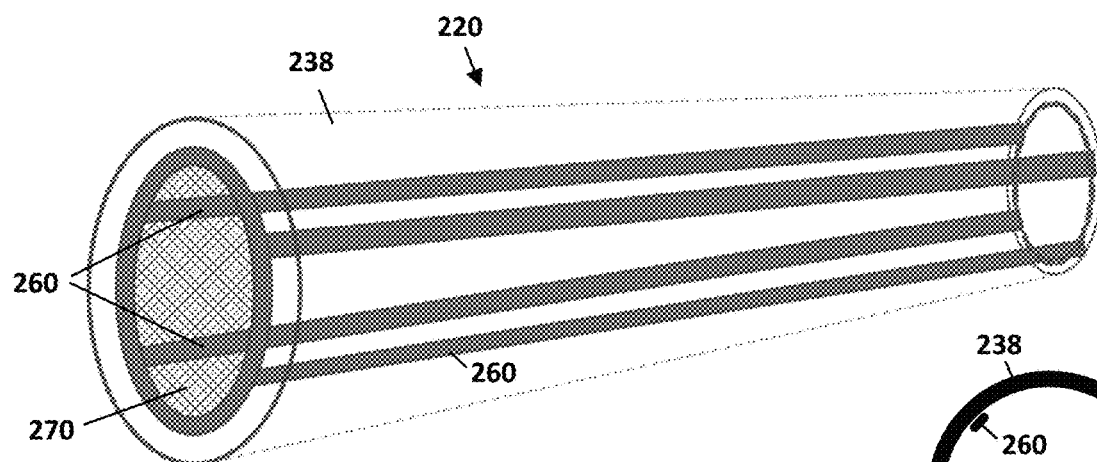
FIG. 21 is a perspective view of a representation of an example embodiment of an ion mobility spectrometer.
Figure 22:
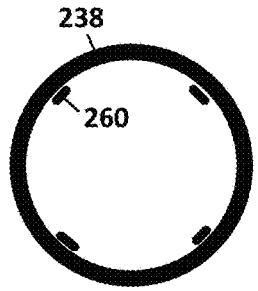
FIG. 22 is a cross sectional view of an embodiment, similar to the one of FIG. 21, showing electrodes disposed radially around a longitudinal axis of the ion channel in a spaced-apart arrangement.

FIG. 21 is a perspective view of a representation of an example embodiment of an ion mobility spectrometer (IMS) 220 in accordance with the present disclosure. This embodiment is similar to the embodiment of FIG. 19 except that rather than the resistive conductor comprising a plurality of elongate resistive conductor elements 250, the resistive conductor comprises a coating 270 including a resistive material disposed at body 238 in the ion channel 240. Coating 270 may be provided on a surface of body 238 that defines channel 240, or on an outer surface of body 238, or partially or fully embedded within body 238. FIG. 22 is a cross sectional view of an embodiment, similar to the one of FIG. 21, showing electrodes 260 disposed radially around a longitudinal axis of the ion channel in a spaced-apart arrangement.

It is noted that FIG. 21 shows some of electrodes 260 through body 238 for illustrative purposes. It is to be appreciated that unless body 238 is made of a transparent material, it would not be possible to actually see electrodes 260 through body 238.

In another embodiment, body 238 may be made of, or comprise, an electrically conductive material such that the resistive conductor comprises or consists of body 238. The electrically conductive material may be a poorly conductive material. Mere examples of such poorly conductive materials include carbon, metal-loaded plastics, nanoparticles composites, and so on. In such an embodiment, electrodes 260 may be electrically isolated from body 238 by, for example, providing an insulating material between electrodes 260 and body 238.

Figure 23:
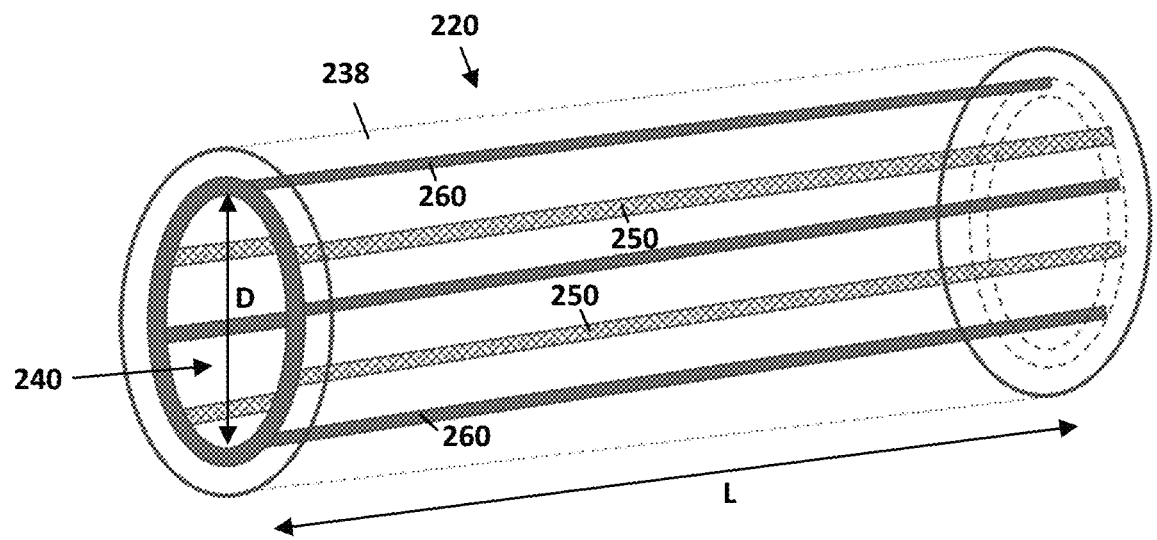
FIG. 23 is a perspective view of a representation of an example embodiment of an ion mobility spectrometer.

FIG. 23 is a perspective view of a representation of an example embodiment of an ion mobility spectrometer (IMS) 220 in accordance with the present disclosure. This embodiment is similar to the embodiment of FIG. 19. However, in this embodiment, body 238 defines ion channel 240 to have a constant diameter D along the ion channel. The diameter D may be constant along the entire length L of channel 240.

Since the diameter D of ion channel 240 is constant, the resistive conductor may have a gradient of resistivity along channel 240 to produce an electric field gradient facilitating the focusing effect. In general, the gradient of resistance of a resistive conductor refers to how the electric field generated by the application of a DC signal increases as the resistance increases. In this way, the resistive conductor is configured to generate an electric field gradient along the ion channel when a DC signal is applied across the resistive conductor. In this embodiment, the gradient of resistivity increases in the direction from the input section 237 to output section 239 in body 238, thereby providing a similar focusing effect on ions in the channel similar to other embodiments, such as FIG. 19, when channel 240 diameter D decreases in the same direction.

In this embodiment, as in the embodiment of FIG. 19, the resistive conductor comprises a plurality of elongate resistive conductor elements 250 disposed at body 238 in ion channel 240 and extending along ion channel 240 in a direction along its length L. Here, elongate resistive conductor elements 250 may have a gradient of resistivity along ion channel 240.

A gradient of resistance in a resistive conductor may be provided by, for example, providing a varying thickness of the conductor or a varying material composition of the conductor along the length of the conductor.

Figure 24:
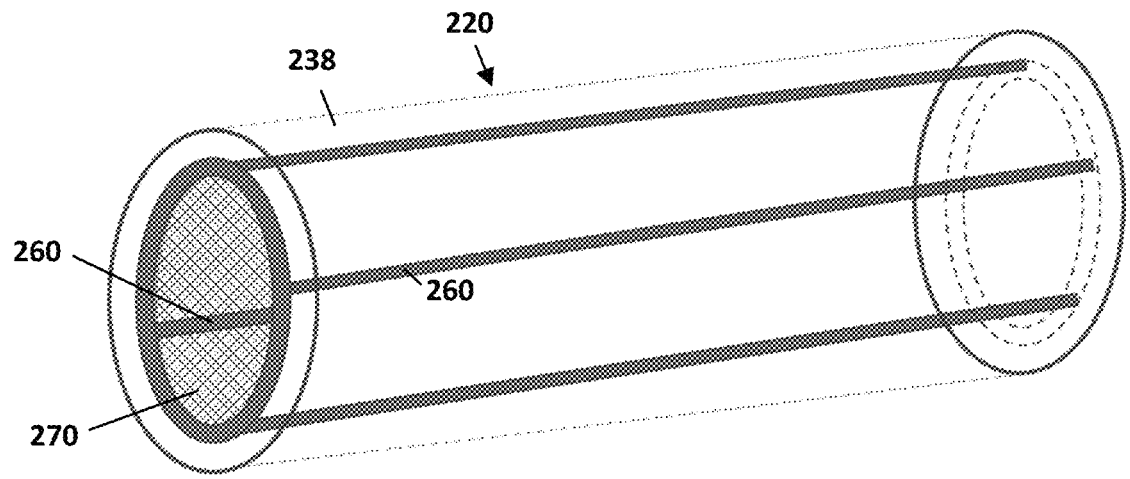
FIG. 24 is a perspective view of a representation of an example embodiment of an ion mobility spectrometer.

FIG. 24 is a perspective view of a representation of an example embodiment of an ion mobility spectrometer (IMS) 220 in accordance with the present disclosure. This embodiment is similar to the embodiment of FIG. 23, where ion channel 240 has a constant diameter D along the channel, except that rather than the resistive conductor comprising a plurality of elongate resistive conductor elements 250, the resistive conductor comprises a coating 270 including a resistive material disposed at body 238 in the ion channel 240. Coating 270 may be provided on a surface of body 238 that defines channel 240. In this regard, this is similar to the embodiment shown in FIG. 21.

In an embodiment, there may be provided both an ion channel having a diameter D that varies monotonically, and a resistive conductor having a gradient of resistivity.

In an embodiment, an entrance guide may be provided at the input section of the ion channel, the entrance guide configured to guide ions to the ion channel. An exit guide may be provided at the output section of the ion channel, the exit guide to guide ions exiting the analyzer out of the ion mobility spectrometer.

In an embodiment, the IMS may include a detector for detecting the ions. The detector of ions may be, for example, a faraday cup or a mass spectrometer. SPME may be used as a sampling or introduction device.

In an embodiment, the ion mobility analyzer is configured to receive, at the input section, a flowing carrier gas and to provide the flowing carrier gas to the ion channel. The ion mobility analyzer comprises at least one of: a source of carrier gas providing the flowing carrier gas; a source of reagent carrier gas providing the flowing carrier gas; and a source of carrier gas providing the flowing carrier gas and a source of reagent compound configured to provide a reagent compound for mixing with the flowing carrier gas.

Embodiments according to the present disclosure may be applied to focus ions in any non-conductive media including in a condense phase such as liquids. To avoid negative wall effects, such as parabolic flow profiles associated with viscosity of the media and loss of ions to surface adsorption, the sheath flow can be used to surround the center flow containing ions. In addition, to prevent interaction of ions with the surface of the body defining the ion channel, chemical deactivation material may be applied at the surface, which is often used when separating in liquids. Furthermore, an AC multipole field may be used to focus ions radially in the center of the ion channel, which is often used in low pressure gas phase separations. Also, an approach of using a body made of an electrically conductive material may be used in ion mobility instruments that do not use focusing of ions in the drift tube but rather produce a uniform electric filed required to separate ions based on their arrival time at the detector.

In another aspect according to the present disclosure, an ion mobility analyzer is provided comprising a transparent material for the channel body. Photo-excitation, for example, a tunable laser source may be employed to study ions trapped within the device. Trapped ion spectroscopy is usually done in a low-pressure open ion trap but not within the mobility device.

In an embodiment, an ion mobility analyzer is provided wherein RF voltage may be applied to adjacent sets of electrodes along the flow axis to induce fragmentation of ions trapped within the device. Fragments may then be analyzed in subsequent regions of the mobility analyzer.

In the preceding description, for purposes of explanation, numerous details are set forth in order to provide a thorough understanding of the embodiments of the disclosure. However, it will be apparent to one skilled in the art that these specific details are not required in order to practice the disclosure. In other instances, well-known electrical structures and circuits are shown in block diagram form in order not to obscure the disclosure. For example, specific details are not provided as to whether the embodiments of the disclosure described herein are implemented as a software routine, hardware circuit, firmware, or a combination thereof.

Embodiments of the disclosure can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described disclosure can also be stored on the machine-readable medium. Software running from the machine-readable medium can interface with circuitry to perform the described tasks.

The above-described embodiments of the disclosure are intended to be examples only. Alterations, modifications and variations can be effected to the particular embodiments by those of skill in the art without departing from the scope of the invention, which is defined solely by the claims appended hereto.

The structure, features, accessories, and/or alternatives of embodiments described and/or shown herein, including one or more aspects thereof, are intended to apply generally to all of the teachings of the present disclosure, including to all of the embodiments described and illustrated herein, insofar as they are compatible. Thus, the present disclosure includes embodiments having any combination or permutation of features of embodiments or aspects herein described.

In addition, the steps and the ordering of the steps of methods and data flows described and/or illustrated herein are not meant to be limiting. Methods and data flows comprising different steps, different number of steps, and/or different ordering of steps are also contemplated. Furthermore, although some steps are shown as being performed consecutively or concurrently, in other embodiments these steps may be performed concurrently or consecutively, respectively.

The terms "a" or "an" are generally used to mean one or more than one. Furthermore, the term "or" is used in a non-exclusive manner, meaning that "A or B" includes "A but not B," "B but not A," and "both A and B" unless otherwise indicated. In addition, the terms "first," "second," and "third," and so on, are used only as labels for descriptive purposes, and are not intended to impose numerical requirements or any specific ordering on their objects.

What is claimed is:

1. A trapped ion mobility spectrometer comprising:
   a source of flowing carrier gas; and
   an analyzer, the analyzer having:
      a body defining an ion channel extending therethrough, the ion channel being continuous, the ion channel having an input section at a first end of the body for receiving ions and an output section at a second end of the body for outputting ions; and
      a plurality of elongate resistive conductor elements disposed at the body in the ion channel and each elongate resistive conductor element extends continuously along a substantially whole length of the ion channel, wherein each elongate resistive conductor element has a gradient of resistance along the length of the ion channel so that the resistive conductor elements are configured to generate an electric field having a gradient along the length of the ion channel when a DC signal is applied across the resistive conductor elements, wherein the electric field exerts a first force on ions within the ion channel in a direction toward the input section, wherein the resistive conductor elements are separate from the body,
      a plurality of electrodes extending along the length of the ion channel and configured to generate a confining field when a time-varying electrical signal is applied to the plurality of electrodes, the confining field for confining ions along the length of the ion channel in a central portion of the ion channel,
   wherein the analyzer is configured to receive, at the input section, the flowing carrier gas and to provide the flowing carrier gas to the ion channel, wherein a pressure differential is provided so that a pressure at the input section is higher than a pressure at the output section such that the flowing carrier gas exerts a second force on ions in the ion channel in a direction toward the output section.

2. The trapped ion mobility spectrometer of claim 1, wherein at least one of: the body comprises an electrically insulating material, and an electrically insulating material separates the body from the resistive conductor elements.

3. The trapped ion mobility spectrometer of claim 1, wherein the plurality of elongate resistive conductor elements comprise a coating that includes a resistive material.

4. The trapped ion mobility spectrometer of claim 1, wherein the plurality of elongate resistive conductor elements are attached to a surface of the body defining the ion channel.

5. The trapped ion mobility spectrometer of claim 1, wherein the time varying electrical signal is a multipole radio frequency (RF) signal.

6. The trapped ion mobility spectrometer of claim 1, wherein the plurality of electrodes are disposed at the body in the ion channel, and wherein the plurality of electrodes are disposed radially around a longitudinal axis of the ion channel.

7. The trapped ion mobility spectrometer of claim 6, wherein the plurality of electrodes comprises at least four electrodes, and wherein the electrodes are disposed radially around the longitudinal axis of the ion channel in a spaced-apart arrangement.

8. The trapped ion mobility spectrometer of claim 7, wherein the plurality of electrodes comprises wires.

9. The trapped ion mobility spectrometer of claim 1, wherein the body defines the ion channel to have a diameter that varies monotonically along the ion channel.

10. The trapped ion mobility spectrometer of claim 9, wherein the body defines the ion channel to have a diameter that varies monotonically along the entire length ion channel.

11. The trapped ion mobility spectrometer of claim 9, wherein the diameter of the ion channel decreases from the input section to the output section.

12. The trapped ion mobility spectrometer of claim 11, wherein the diameter of the ion channel decreases substantially continuously, substantially linearly, or substantially quadratically from the input section to the output section.

13. The trapped ion mobility spectrometer of claim 9, wherein the body defines the ion channel to include a plurality of segments each having a respective substantially constant diameter different from the diameter of the other segments of the plurality of segments.

14. The trapped ion mobility spectrometer of claim 1, wherein the body defines the ion channel to have a constant diameter along the ion channel.

15. The trapped ion mobility spectrometer of claim 14, wherein the body defines the ion channel to have a constant diameter along the entire length of the ion channel.

16. The trapped ion mobility spectrometer of claim 1, further comprising at least one of:
   a source of carrier gas providing the flowing carrier gas;
   a source of reagent carrier gas providing the flowing carrier gas; and a source of carrier gas providing the flowing carrier gas and a source of reagent compound configured to provide a reagent compound for mixing with the flowing carrier gas.

17. The trapped ion mobility analyzer of claim 1, wherein: the ion mobility analyzer is configured to control temperature in the ion channel to be substantially below the ambient temperature.

\* \* \* \* \*